(12) United States Patent
Ali et al.

(10) Patent No.: US 10,909,009 B2
(45) Date of Patent: Feb. 2, 2021

(54) SYSTEM AND METHOD TO CREATE A HIGHLY AVAILABLE QUORUM FOR CLUSTERED SOLUTIONS

(71) Applicant: Dell Products L.P., Hopkinton, MA (US)

(72) Inventors: Rizwan Ali, Cedar Park, TX (US); Ravikanth Chaganti, Bangalore (IN); Dharmesh M. Patel, Round Rock, TX (US); Jenwei Hsieh, Austin, TX (US)

(73) Assignee: Dell Products L.P., Hopkinton, MA (US)

( * ) Notice: Subject to any disclaimer, the term of this patent is extended or adjusted under 35 U.S.C. 154(b) by 91 days.

(21) Appl. No.: 16/177,922

(22) Filed: Nov. 1, 2018

(65) Prior Publication Data
US 2020/0142789 A1  May 7, 2020

(51) Int. Cl.
| G06F 11/00 | (2006.01) |
| G06F 11/20 | (2006.01) |
| G06F 11/16 | (2006.01) |
| H04L 12/24 | (2006.01) |
| H04L 12/26 | (2006.01) |

(52) U.S. Cl.
CPC ...... *G06F 11/2028* (2013.01); *G06F 11/1658* (2013.01); *H04L 41/0668* (2013.01); *H04L 43/0817* (2013.01); *G06F 2201/85* (2013.01)

(58) Field of Classification Search
CPC ............. G06F 11/2023; G06F 11/2025; G06F 11/2028; G06F 11/203
See application file for complete search history.

(56) References Cited

U.S. PATENT DOCUMENTS

| 7,222,127 | B1 | 5/2007 | Bem et al. |
| 7,478,263 | B1 | 1/2009 | Kownacki et al. |
| 7,516,362 | B2 | 4/2009 | Connelly et al. |
| 7,987,353 | B2 | 7/2011 | Holdaway et al. |
| 8,386,930 | B2 | 2/2013 | Dillenberger et al. |
| 8,401,982 | B1 | 3/2013 | Satish et al. |
| 8,583,769 | B1 | 11/2013 | Peters et al. |
| 8,868,987 | B2 | 10/2014 | Wagner |

(Continued)

FOREIGN PATENT DOCUMENTS

EP        3368985 B1    6/2019

OTHER PUBLICATIONS

Jason Gerend et al.; "Deploy a Cloud Witness for a Failover Cluster"; Microsoft Docs; Apr. 28, 2018; https://docs.microsoft.com/en-us/windows-server/failover-clustering/deploy-eloud-witness.

(Continued)

*Primary Examiner* — Elmira Mehrmanesh
(74) *Attorney, Agent, or Firm* — Chamberlain, Hrdlicka, White, Williams, & Aughtry

(57) ABSTRACT

A node for a distributed system includes computing resources and a node manager. The node manager identifies a failure of a second node of the distributed system; in response to identifying the failure: makes a first determination that the second node is a primary node of the distributed system; after making the first determination: identifies a new primary node by accessing a distributed system configuration stored in a primary share out-of-band management entity; and provides services of the distributed system to a client using the computing resources after identifying the new primary node.

19 Claims, 18 Drawing Sheets

(56) References Cited

U.S. PATENT DOCUMENTS

| | | | |
|---|---|---|---|
| 8,874,892 | B1 | 10/2014 | Chan et al. |
| 9,122,501 | B1 | 9/2015 | Hsu et al. |
| 9,201,751 | B1 | 12/2015 | Muthirisavenugopal et al. |
| 9,278,481 | B2 | 3/2016 | Hull |
| 9,355,036 | B2 | 5/2016 | Beard et al. |
| 9,485,163 | B1 | 11/2016 | Fries et al. |
| 9,898,224 | B1 | 2/2018 | Marshak et al. |
| 10,057,184 | B1 | 8/2018 | Prahlad et al. |
| 10,097,620 | B2 | 10/2018 | Reddy et al. |
| 2011/0276822 | A1 | 11/2011 | Abdul et al. |
| 2013/0086262 | A1* | 4/2013 | Bhadri ................. G06F 13/105 709/224 |
| 2013/0151646 | A1* | 6/2013 | Chidambaram .... H04L 47/6205 709/213 |
| 2014/0032959 | A1* | 1/2014 | Dawkins ............. G06F 11/2048 714/6.3 |
| 2015/0019900 | A1* | 1/2015 | Griffith ............... G06F 11/2048 714/4.11 |
| 2016/0239371 | A1* | 8/2016 | Jose .................... G06F 11/0793 |
| 2017/0126479 | A1* | 5/2017 | Vangheepuram ... H04L 41/0654 |
| 2017/0244781 | A1* | 8/2017 | Walton ................ G06F 11/3006 |
| 2018/0019923 | A1* | 1/2018 | Huynh ................... H04L 67/10 |
| 2018/0367371 | A1* | 12/2018 | Nagarajan ........... H04L 43/0805 |

OTHER PUBLICATIONS

John Marlin; "New File Share Witness Feature in Windows Server 2019"; MSDN Blog, Server & Management Blogs, Clustering and High-Availability; Apr. 16, 2018; https://blogs.msdn.microsoft.com/clustering/2018/04/16/new-file-share-witness-feature-in-windows-server-2019/.

Extended European Search Report issued in corresponding European Application No. 19201050.2, dated Nov. 29, 2019.

* cited by examiner

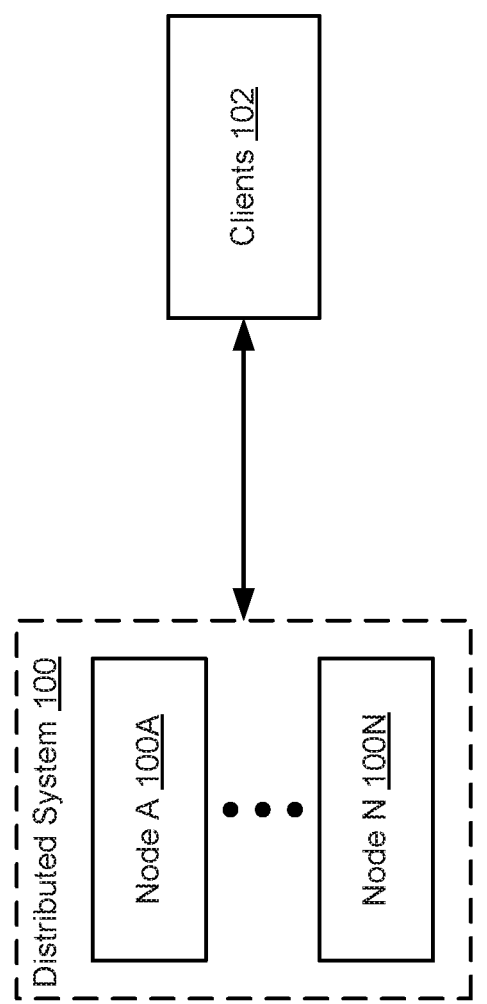
FIG. 1.1

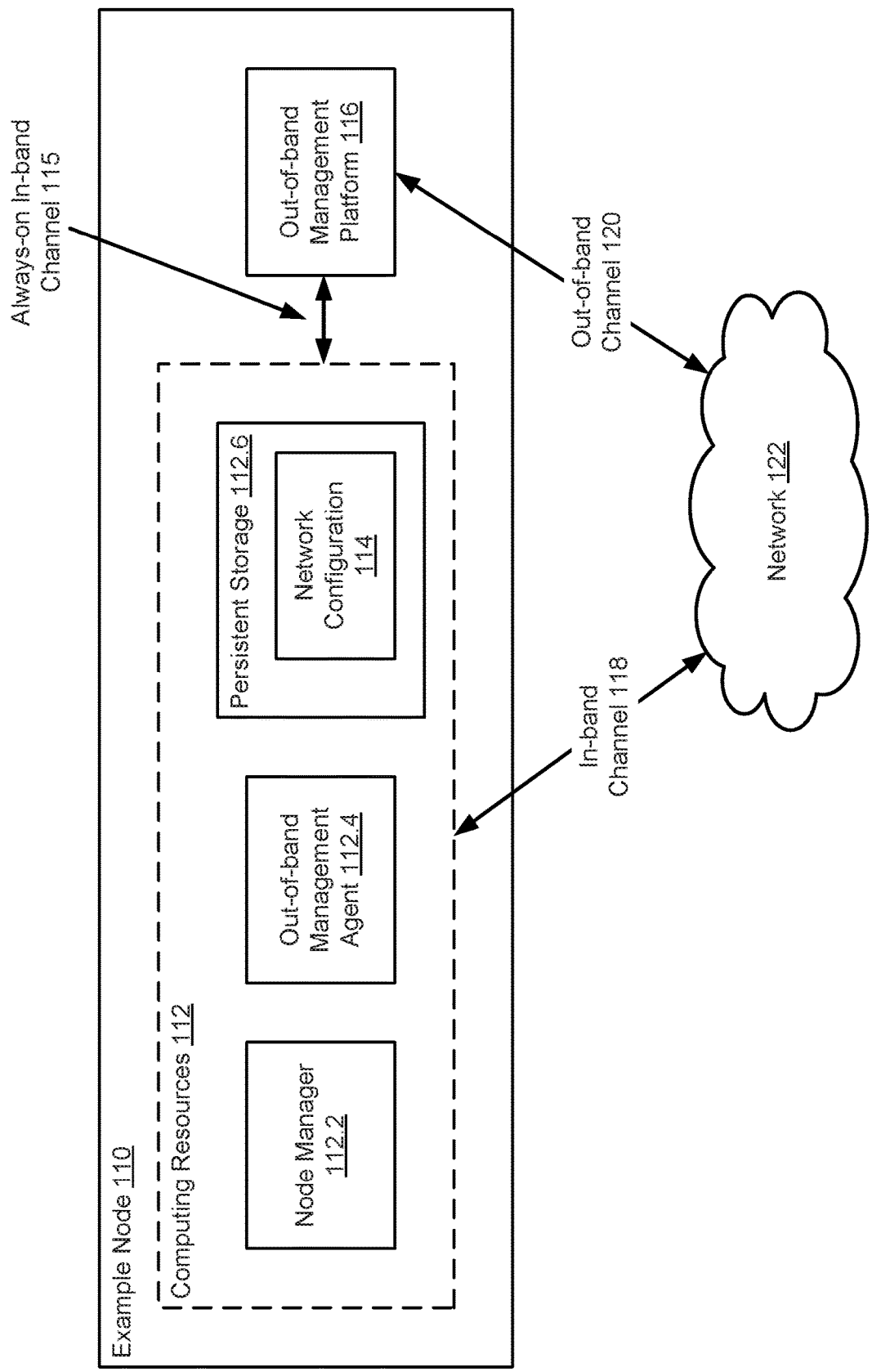
FIG. 1.2

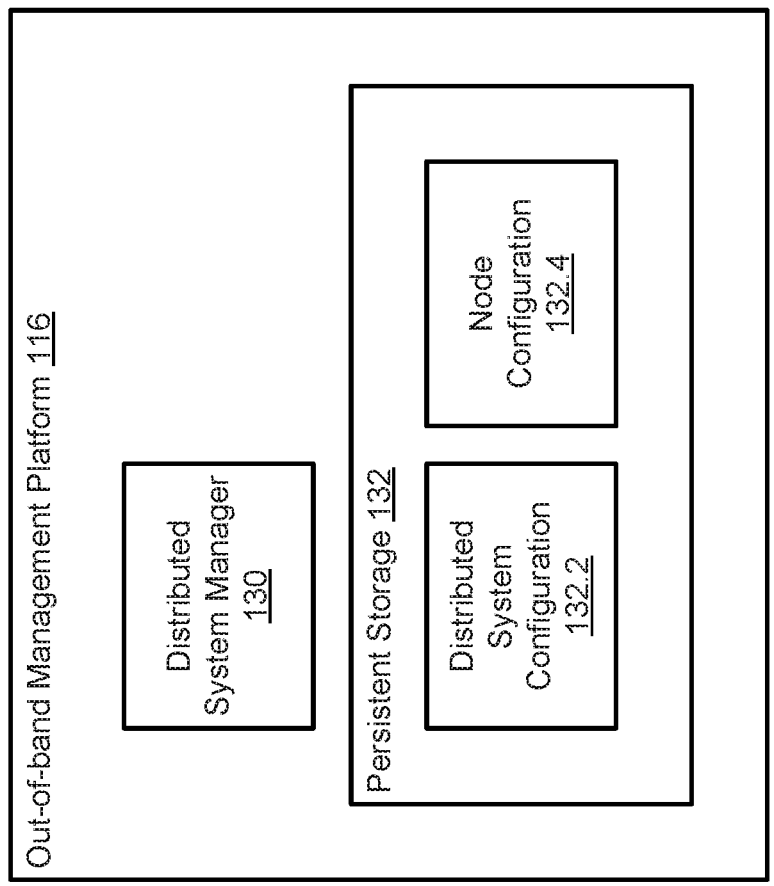
FIG. 1.3

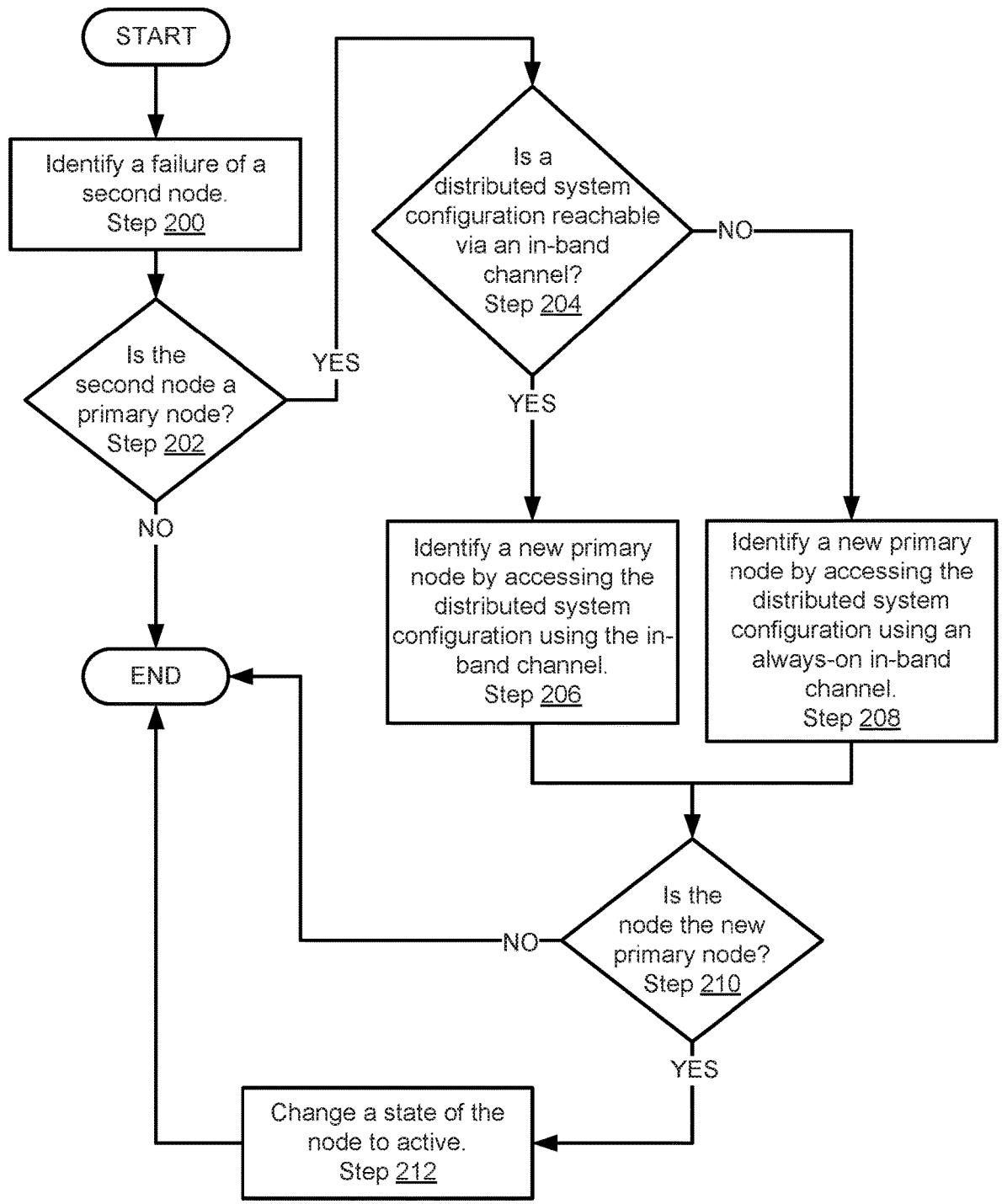
FIG. 2.1

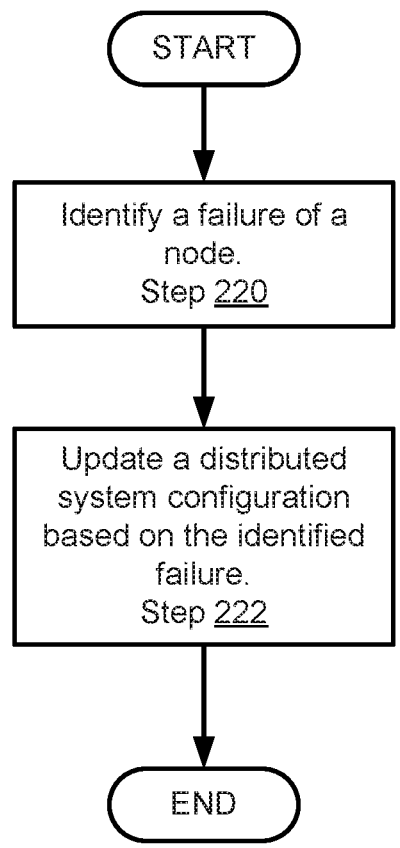
FIG. 2.2

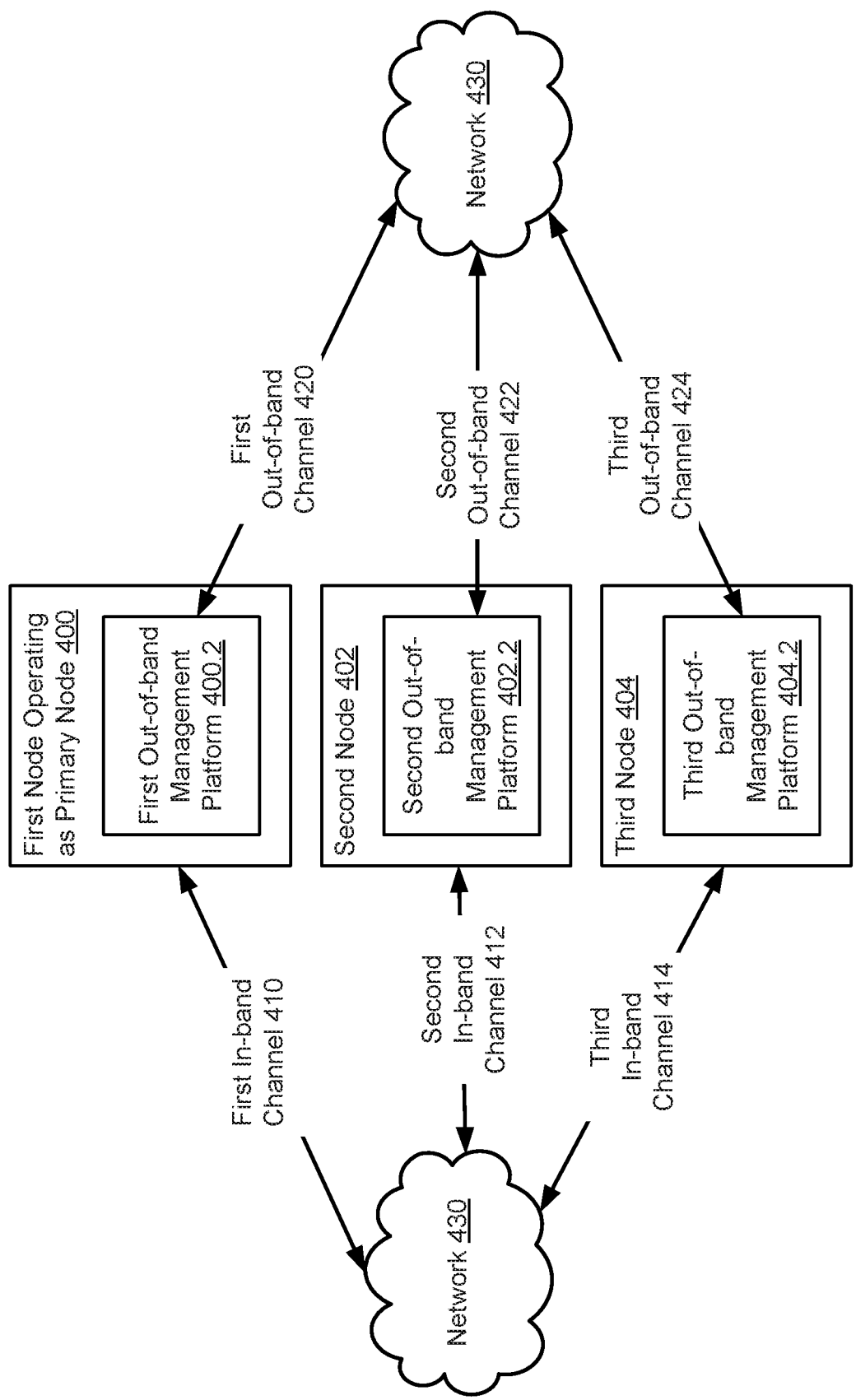
FIG. 4.1

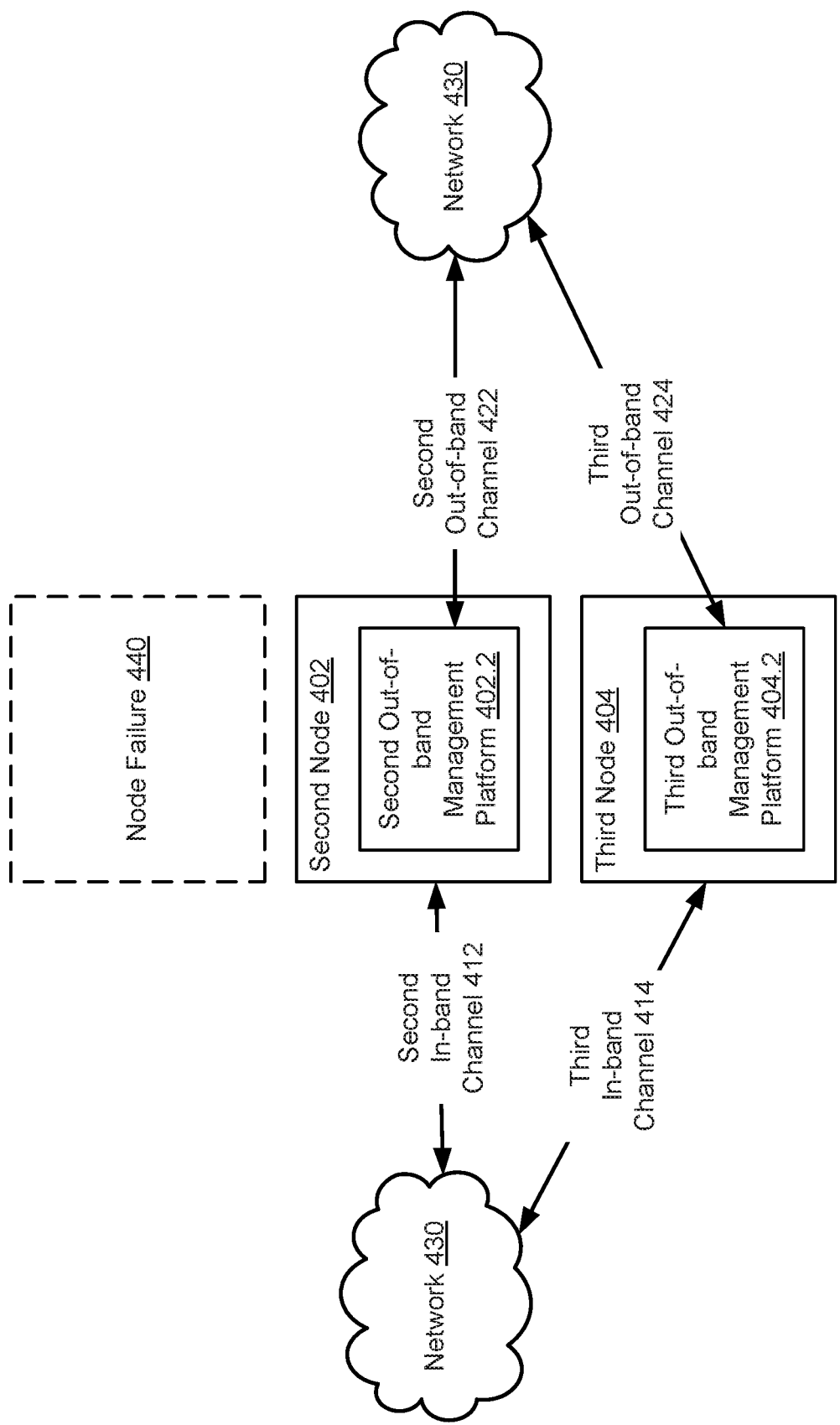
FIG. 4.2

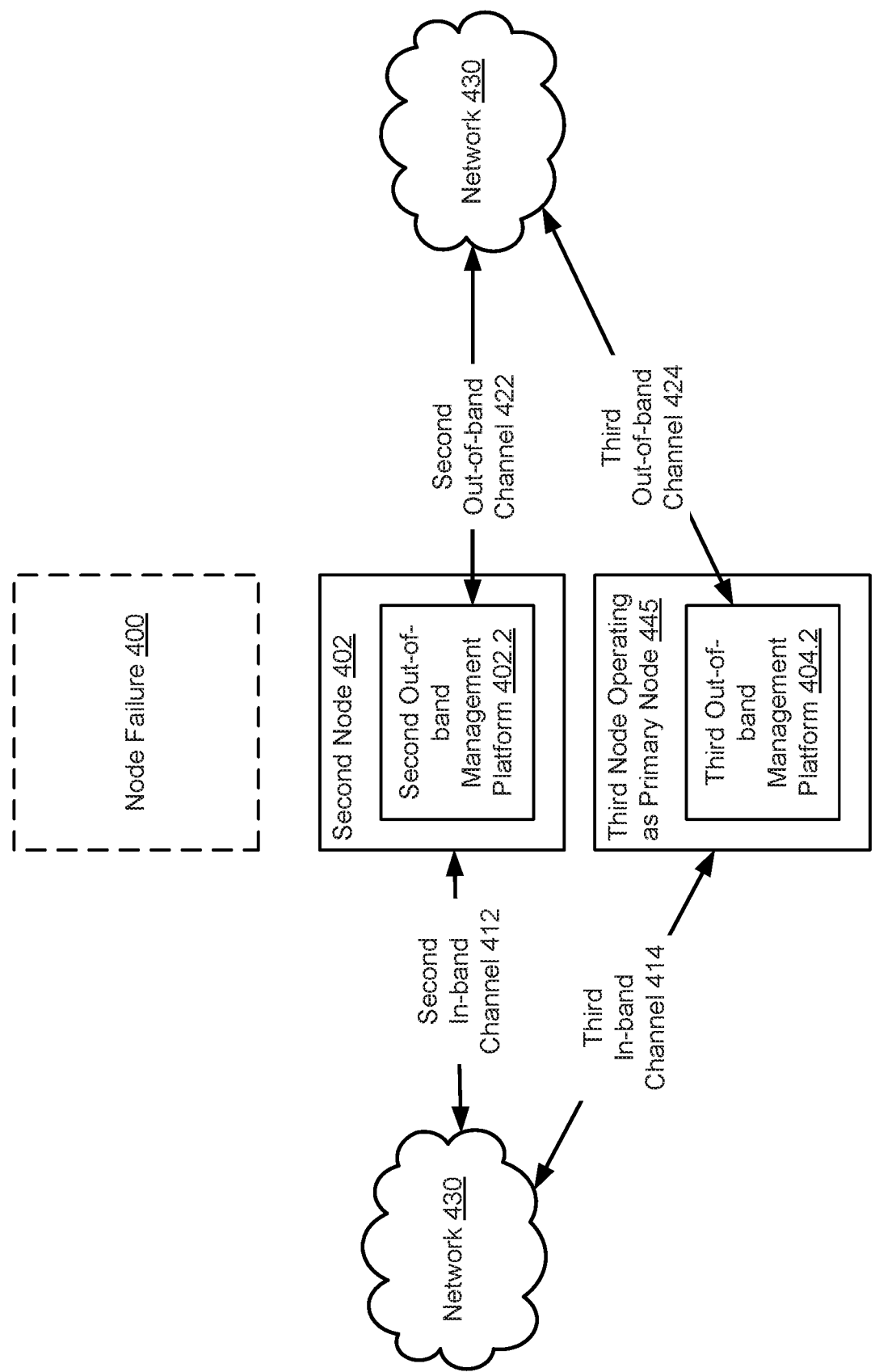
FIG. 4.3

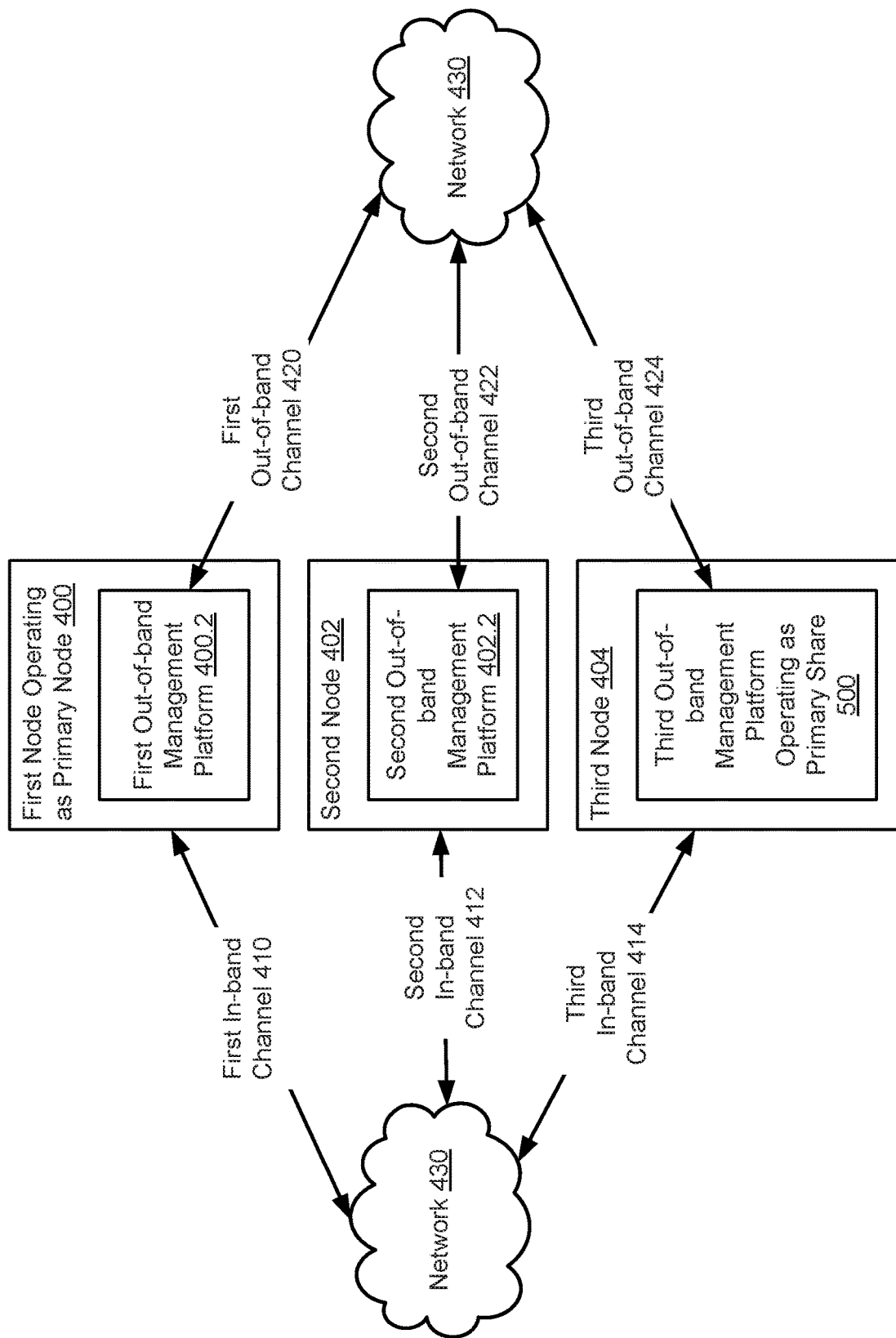
FIG. 5.1

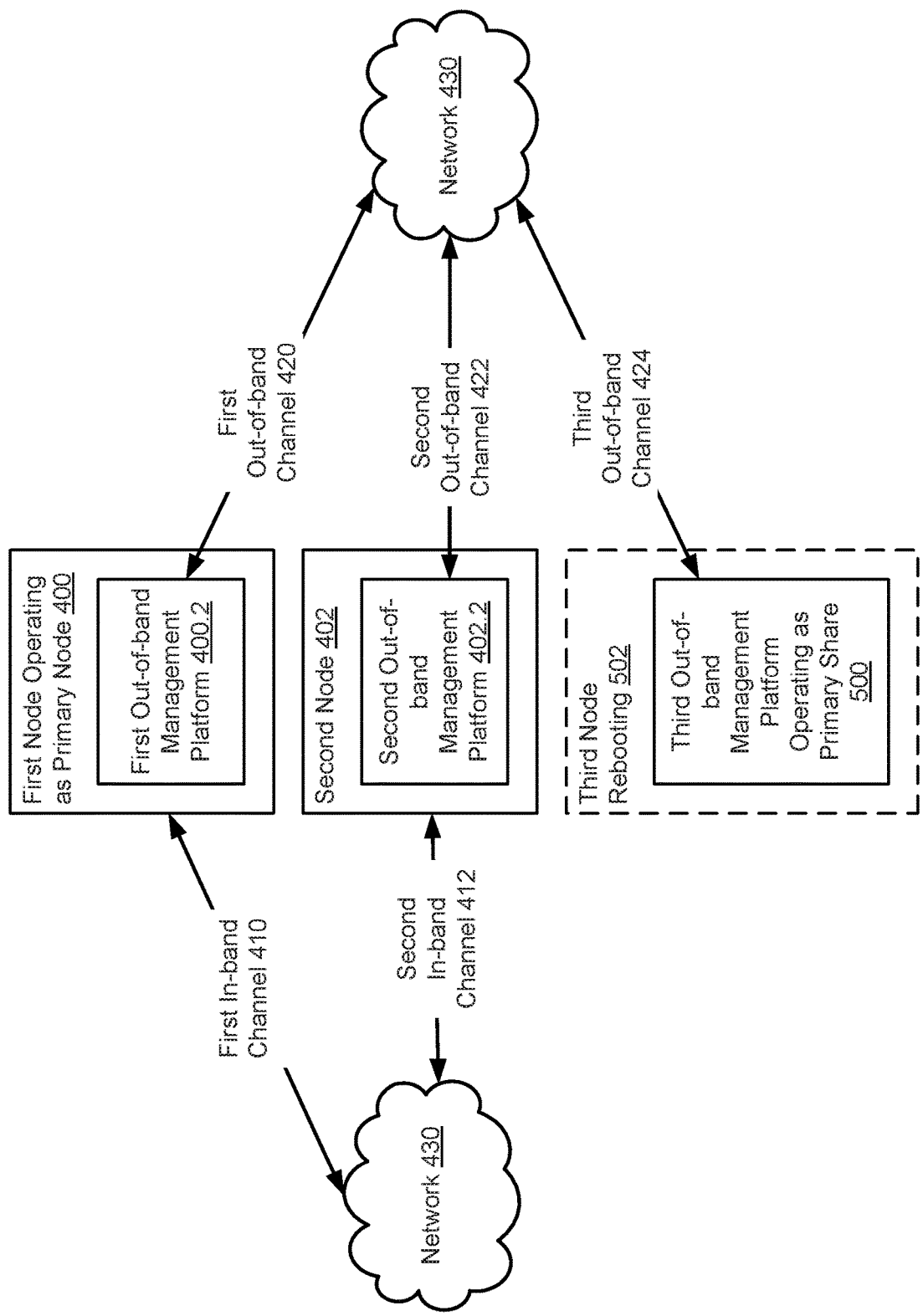
FIG. 5.2

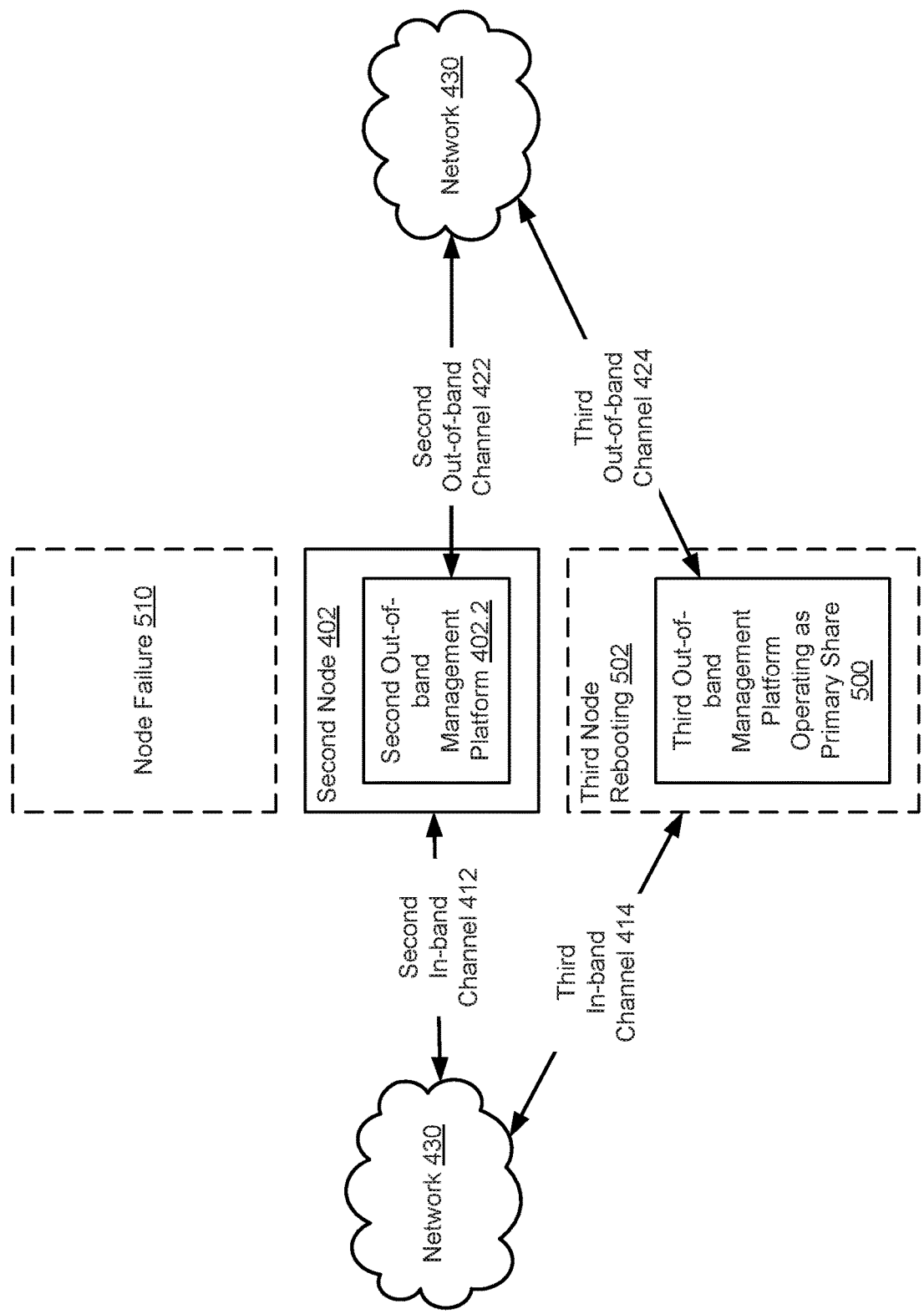
FIG. 5.3

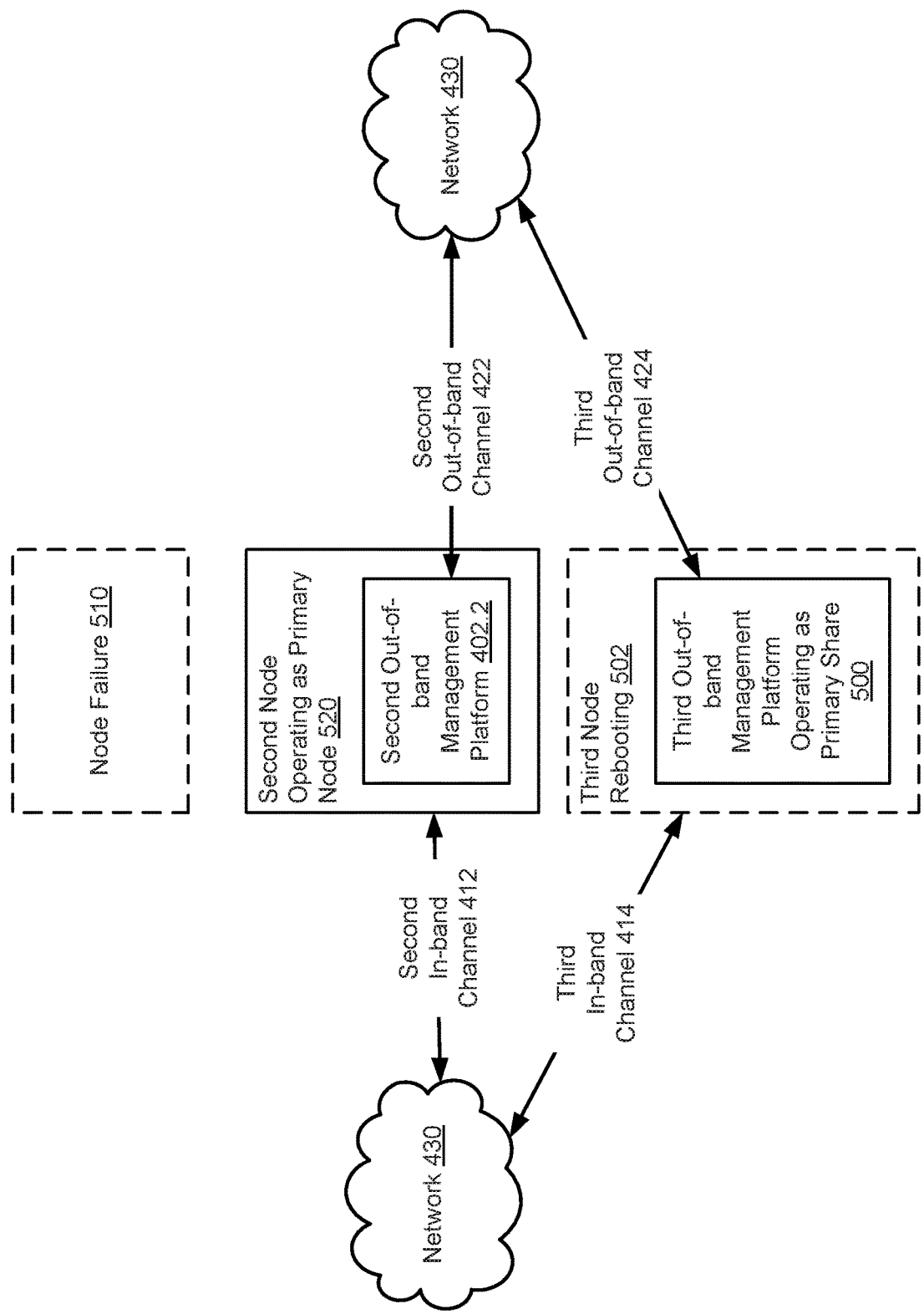
FIG. 5.4

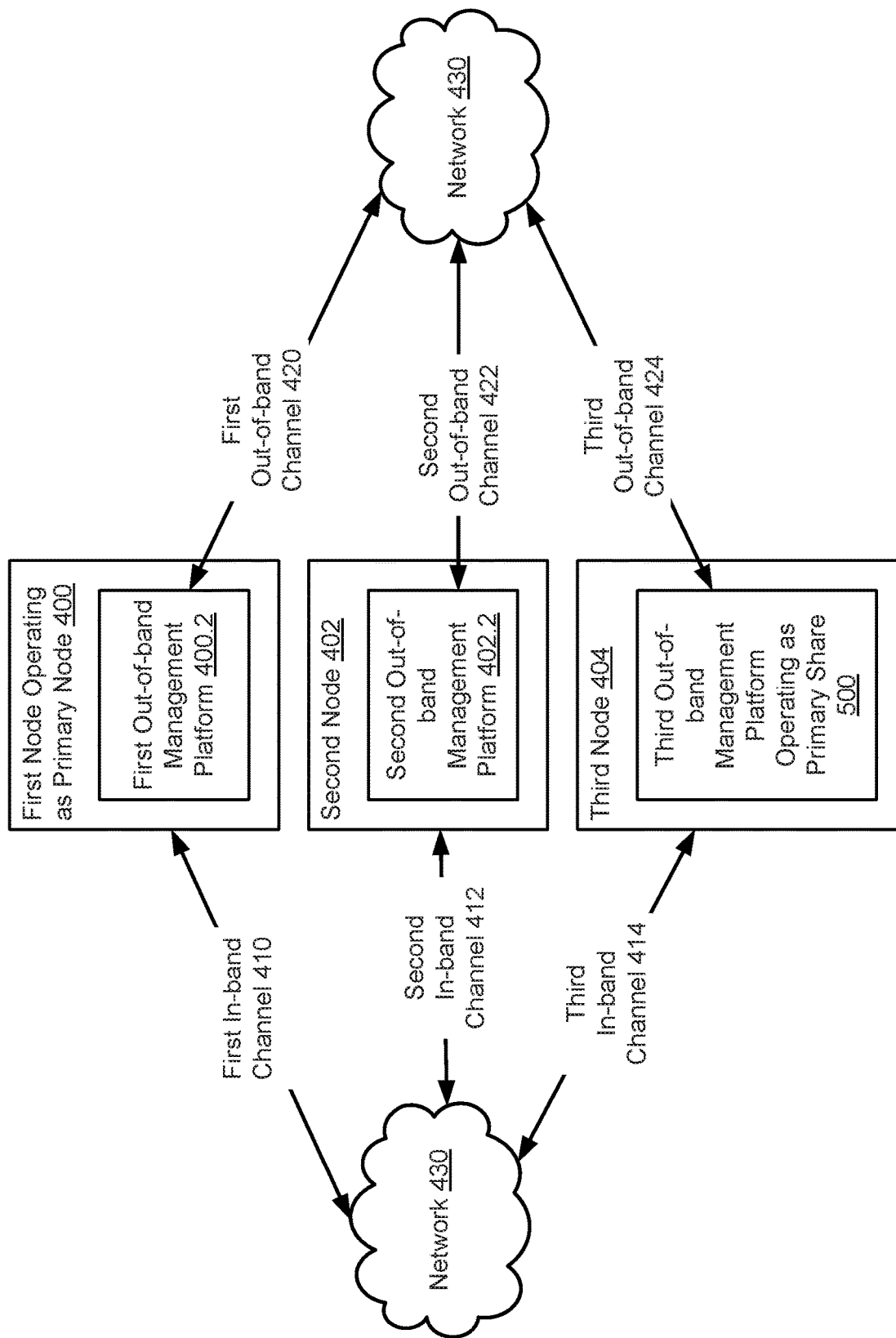
FIG. 6.1

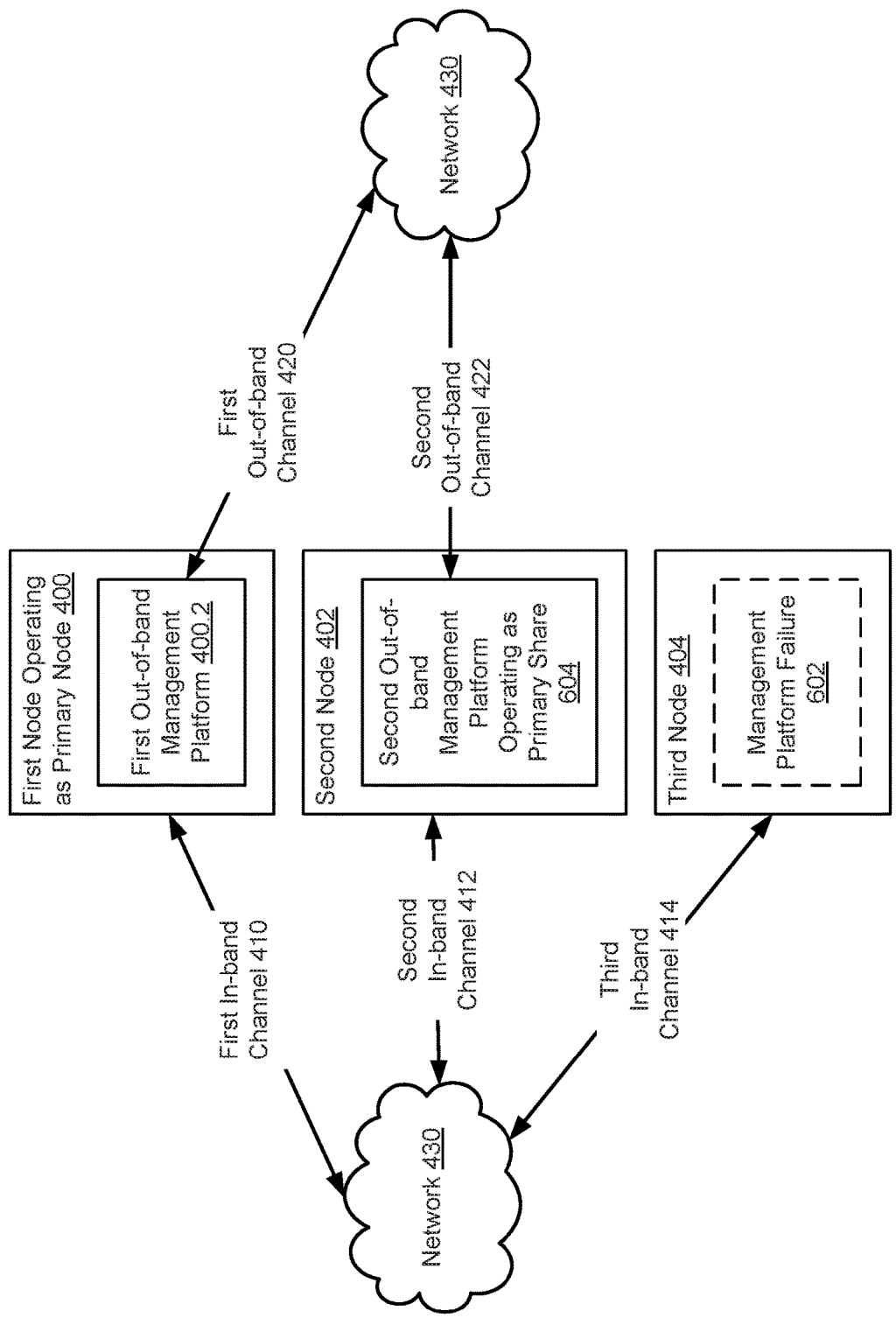
FIG. 6.2

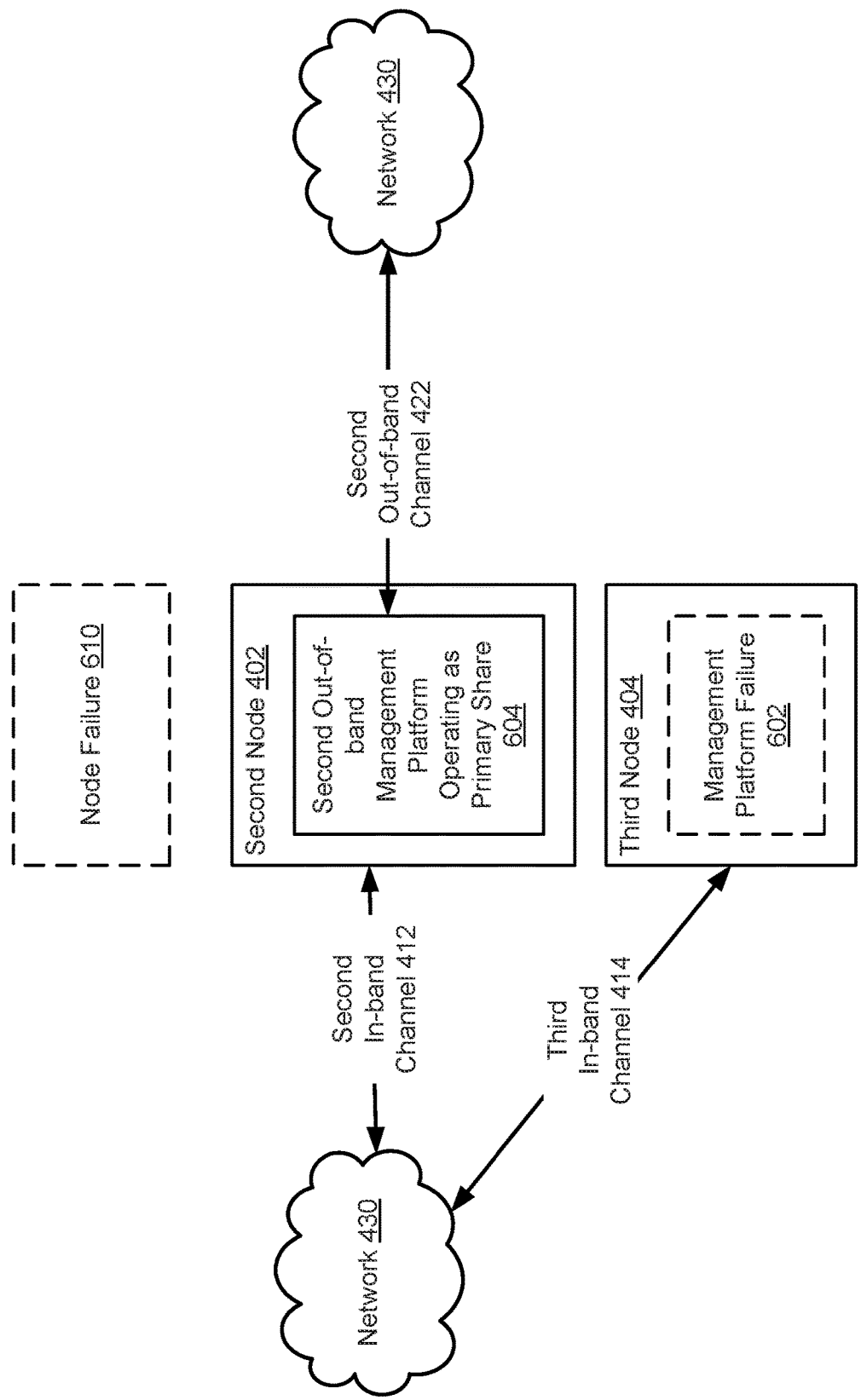
FIG. 6.3

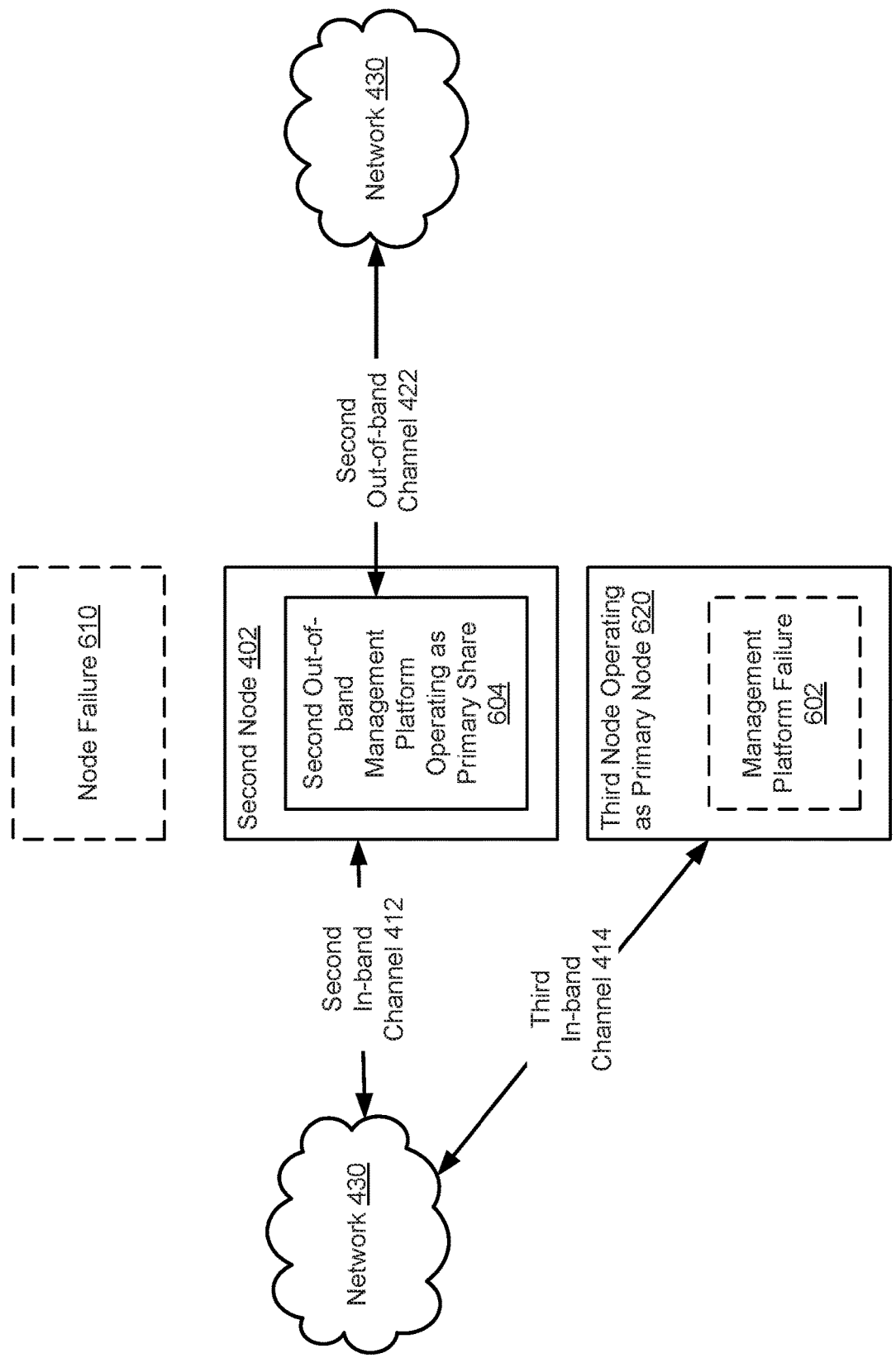
FIG. 6.4

SYSTEM AND METHOD TO CREATE A HIGHLY AVAILABLE QUORUM FOR CLUSTERED SOLUTIONS

BACKGROUND

Computing devices such as personal computers, laptop computers, servers, and other types of devices may operate in a networked environment. For example, a personal computer may communicate with a server using an operable connection. To facilitate communications between devices, the communications between each of the devices are organized in a predetermined manner. For example, each computing device in a network environment may communicate with one another using a standardized communication method that considers communications of other computing devices in the network environment.

SUMMARY

In one aspect, a node for a distributed system in accordance with one or more embodiments of the invention includes computing resources and a node manager. The node manager identifies a failure of a second node of the distributed system; in response to identifying the failure: makes a first determination that the second node is a primary node of the distributed system; after making the first determination: identifies a new primary node by accessing a distributed system configuration stored in a primary share out-of-band management entity; and provides services of the distributed system to a client using the computing resources after identifying the new primary node.

In one aspect, a method for managing a node of a distributed system in accordance with one or more embodiments of the invention includes identifying a failure of a second node of the distributed system; in response to identifying the failure: making a first determination that the second node is a primary node of the distributed system; after making the first determination: identifying a new primary node by accessing a distributed system configuration stored in a primary share out-of-band management entity; and providing services of the distributed system to a client using computing resources of the node after identifying the new primary node.

In one aspect, a non-transitory computer readable medium in accordance with one or more embodiments of the invention includes computer readable program code, which when executed by a computer processor enables the computer processor to perform a method for managing a node of a distributed system. The method includes identifying a failure of a second node of the distributed system; in response to identifying the failure: making a first determination that the second node is a primary node of the distributed system; after making the first determination: identifying a new primary node by accessing a distributed system configuration stored in a primary share out-of-band management entity; and providing services of the distributed system to a client using computing resources of the node after identifying the new primary node.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example node accordance with one or more embodiments of the invention.

FIG. 1.3 shows a diagram of an out-of-band management platform accordance with one or more embodiments of the invention.

FIG. 2.1 shows a flowchart of a method of managing a distributed system in accordance with one or more embodiments of the invention.

FIG. 2.2 shows a flowchart of a method of updating a distributed system configuration in accordance with one or more embodiments of the invention.

FIGS. 4.1-4.3 show diagrams of an example of a system over time.

FIGS. 5.1-5.4 show diagrams of a second example of a system over time.

FIGS. 6.1-6.4 show diagrams of a third example of a system over time.

DETAILED DESCRIPTION

Figure 3:
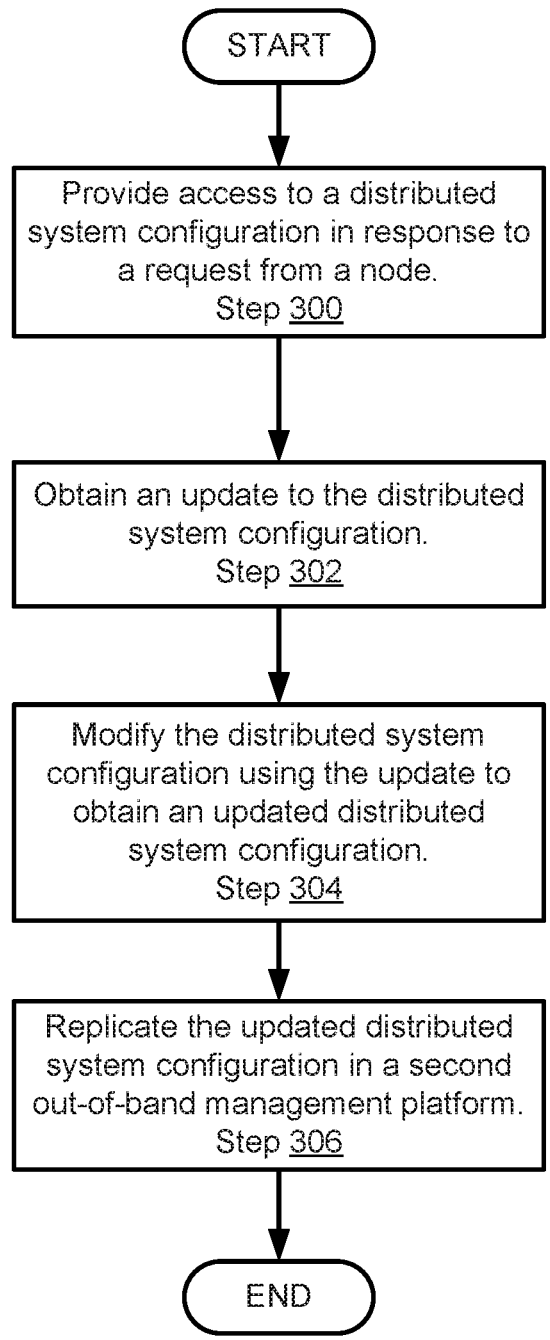
FIG. 3 shows a flowchart of a method of managing a distributed system configuration in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing distributed systems. In one or more embodiments of the invention, a distributed system includes any number of nodes. Each of the nodes may be a physical computing device such as, for example, a server.

In one or more embodiments of the invention, each of the nodes includes an out-of-band management platform. The out-of-band management platforms of the nodes may support a highly available file share. A configuration for the distributed system, e.g., a quorum, may be stored in the highly available file share. The out-of-band management platforms may maintain the consistency of a copy of the configuration for the distributed system and persistent storage for each of the out-of-band management platforms.

In one or more embodiments of the invention, each of the out-of-band management platforms may be operably connected to the computing resources of respective host nodes via an always-on in-band channel. Each of the out-of-band management platforms may also be operably connected to other entities via an out-of-band channel. Thus, the out-of-band management platforms may support at least two redundant communication channels. By doing so, the out-of-band management platforms may provide the highly available file share and ensure that the nodes have access to the configuration for the distributed system.

Thus, embodiments of the invention may provide an improved architecture for a distributed system that reduces the likelihood of portions of the nodes of a distributed system being unable to access a configuration for the distributed system. By doing so, embodiments of the invention may improve the likelihood that nodes of the distributed system are able to effectively cooperate to provide the functionality of the distributed system. In contrast, contemporary systems may be susceptible to failure due to nodes of the distributed system being unable to access a configuration for the distributed system due to component failure of the distributed system.

FIG. 1.1 shows a diagram of an example system in accordance with one or more embodiments of the invention. The system may include a distributed system (100) that provides services to clients (102). For example, the distributed system (100) may provide data storage services, electronic communication services, and/or database services. The distributed system (100) may provide any type and number of computer implemented service to the clients (102) without departing from the invention.

To provide services to the clients (102), the nodes of the distributed system may be organized to cooperatively provide the services of the distributed system (100). For example, different of the nodes (e.g., 100A, 100N) of the distributed system (100) may be programmed to perform similar and/or different functions of the distributed system (100).

In one or more embodiments of the invention, some of the nodes of the distributed system (100) are programmed to provide failover services for other nodes of the distributed system (100). For example, a first portion of the nodes (e.g., 100A) may be programmed to actively provide database services to the clients (102) while a second portion of the nodes (e.g., 100N) may be programmed to passively wait to provide database services to the clients (102) in the event of a failure of one of the nodes of the first portion of the nodes. By doing so, embodiments of the invention may provide a distributed system (100) that seamlessly provides services to the clients (102) even in the event of a failure of some of the nodes of the distributed system (100).

In one or more embodiments of the invention, the distributed system (100) does not include a separate entity for management of the nodes of the distributed system (100). For example, one or more nodes of the distributed system (100) are not dedicated management nodes. Rather, as will be discussed in greater detail below, embodiments of the invention may provide a distributed system that organizes itself using a highly available file share supported by the nodes of the distributed system. By doing so, a distributed system in accordance with embodiments of the invention may be fault-tolerant in that the failure of any particular node or entity within the distributed system may not impair the ability of the distributed system to coordinate the operation of the nodes of the distributed system.

The nodes (e.g., 100A, 100N) of the distributed system (100) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or a portion, of the methods illustrated in FIGS. 2.1-3. The nodes (e.g., 100A, 100N) may be other types of computing devices without departing from the invention. For additional details regarding computing devices, refer to FIG. 7. For additional details regarding nodes (e.g., 100A, 100N) of the distributed system (100), refer to FIG. 1.2.

The clients (102) may obtain services from the distributed system (100), as noted above. Any number of clients (102) may receive services from the distributed system (100) without departing from the invention. Other entities may also receive services from the distributed system (100) without departing from the invention.

The clients (102) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (102) may be other types of computing devices without departing from the invention. For additional details regarding computing devices, refer to FIG. 7.

The clients (102) may be logical devices without departing from the invention. For example, the clients (102) may be virtual machines that utilize computing resources of any number of physical computing devices.

The components of the system of FIG. 1.1 may be operably connected via any combination of wired and/or wireless networks.

While for the sake of brevity the system of FIG. 1.1 has been illustrated as including a limited number of components, embodiments of the invention may include additional components without departing from the invention.

FIG. 1.2 shows a diagram of an example node (110) in accordance with one or more embodiments of the invention. The example node (110) may be similar to the nodes (e.g., 100A, 100N) illustrated in FIG. 1.1.

As discussed with respect to FIG. 1.1, the example node (110), as part of a distributed system, may provide services to clients. To provide services to the clients, the example node (110) may include functionality to self-organize with other nodes of a distributed system to provide the services to the clients.

In one or more embodiments of the invention, the example node (110) self-organizes with other nodes by automatically determining a function to be performed by the example node (110) and self-configuring to perform the function. To do so, each of the nodes of the distributed system may cooperate to maintain an organizational structure of the nodes of the distributed system. In other words, the nodes the distributed system may self-organize so that independent behavior of each of the nodes, i.e., a function of each node, of the distributed system gives rise to the desired behavior of the distributed system in which the nodes reside.

Self-configuring the example node (110) may place the example node (110) into a predetermined state. The predetermined state may enable the example node (110) to cooperatively perform functions of the distributed system in which the example node (110) resides with other nodes of the distributed system. For example, the example node (110) may be placed into an active or passive state, as will be discussed in greater detail below.

Once self-configured, the example node (110) may provide services to other entities (not shown). For example, the example node (110) may host any number of applications (not shown) that provide computing services to other entities. The computing services may be, for example, database services, email services, instant messaging services, file storage services, and/or any other type of computer implemented services. The example node (110) may provide any number and/or combination of different types of services without departing from the invention.

The other entities may be, for example, clients that rely on the services provided by the applications hosted by the example node (110). Alternatively, the other entities may be, for example, other nodes of a distributed system that provides predetermined functionality. For example, the example node (110) may be one device of multiple devices of a distributed system.

To provide the above-noted functionality of the example node (110), the example node (110) may include computing resources (112) and an out-of-band management platform (116). Each component of the example node (110) is discussed below.

Figure 7:
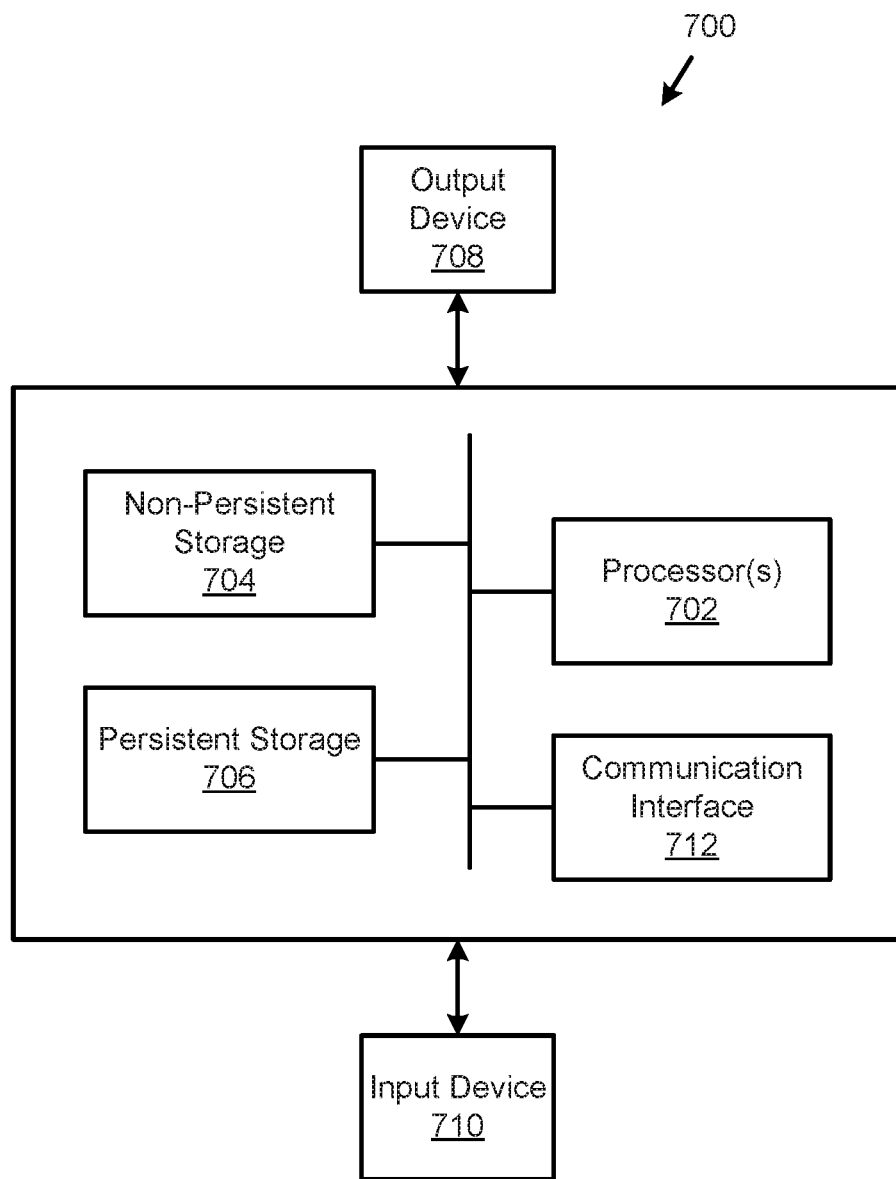
FIG. 7 shows a diagram of a computing device in accordance with one or more embodiments of the invention.

In one or more embodiments of the invention, the computing resources (112) include both physical and virtualized resources. The physical resources may include one or more processors, memory (e.g., random access memory), and persistent storage (112.6) (e.g., disk drives, solid state drives, etc.). An example of physical resources of a computing device is shown in FIG. 7.

The persistent storage (112.6) may store computer instructions, e.g., computer code, that when executed by the processor(s) of the computing device cause the computing device to perform the functions of the example node (110) described in this application and/or all, or a portion, of the methods illustrated in FIGS. 2.1-3. The persistent storage (112.6) may also store other data structures such as, for example, a network configuration (114) regarding the network environment in which the example node (110) resides. The network configuration (114) is discussed in greater detail below.

The physical resources of the computing resources (112) may include additional, fewer, or different hardware resources without departing from the invention.

The virtualized resources may include a node manager (112.2) and an out-of-band management agent (112.4). Each of these virtualized resources may be applications.

The node manager (112.2) may manage a configuration of the example node (110) so that the example node (110) cooperatively functions with other nodes of a distributed system. For example, the node manager (112.2) may identify a configuration for the example node (110) based on a configuration for the distributed system. The node manager (112.2) may self-configure the example node (110) so that the example node (110) meets the requirements of the configuration for the distributed system. The configuration for the example node (110) may specify configuration parameters such as, for example, settings for hardware components, firmware settings, driver software, applications to be hosted by the example node (110), and/or an activity state of the example node (110). The configuration for the example node (110) may include additional, fewer, and/or different configuration parameters without departing from the invention. As will be discussed in greater detail below, the configuration for the example node (110) may be obtained from one or more out-of-band management platforms hosted by the example node (110) and/or other nodes of a distributed system in which the example node (110) resides. The configuration for the example node (110) may be specified as part of a configuration for a distributed system in which the example node (110) resides.

In one or more embodiments of the invention, the configuration for the distributed system is stored in a highly accessible file share location. As will be discussed in greater detail below, the out-of-band management platform (116) hosted by example node (110) and other out-of-band management platforms hosted by other nodes of a distributed system may provide the highly accessible file share location. In contrast, contemporary distributed systems may require a separate and independent entity to serve as a highly accessible file share location for the configuration of the distributed system.

Additionally, the node manager (112.2) may also act in response to failures of other nodes of the distributed system in which the example node (110) resides. For example, in response to a node failure, the node manager (112.2) may act to determine whether the state of the example node (110) should change to ensure that the distributed system is able to provide the services of the distributed system. The node manager (112.2) may access the configuration for the distributed system in response to the node failure to determine whether the example node (110) should change its state to an active state and thereby become a primary node of the distributed system. In an active state, the example node (110) may provide the services of the distributed system to clients. In contrast, in a passive state, the example node (110) may wait to provide failover services in response to the failure of a primary node of the distributed system.

Further, the node manager (112.2) may also support communications with other elements of the distributed system via an in-band channel (118). The in-band channel (118) may operably connect the computing resources (112) to any number of out-of-band management platforms, other nodes, and/or other entities via a network (122). The node manager (112.2) may send communications via the in-band channel (118) using a network adapter, or other type of communications processor, of the computing resources (112).

In one or more embodiments of the invention, the node manager (112.2) accesses the configuration for the distributed system stored in the out-of-band management platforms using the network configuration (114). The network configuration (114) may include a floating Internet protocol address associated with a file share supported by the out-of-band management platforms, in addition to other information that enables the example node (110) to communicate with other entities of a distributed system in which the example node (110) resides.

For example, the floating Internet protocol address may specify an ordered list of the Internet protocol addresses of each of the out-of-band management platforms hosted by any number of nodes of the distributed systems. Each of the out-of-band management platforms may be separately addressable from the respective node that hosts a respective out-of-band management platform. The node manager (112.2) may attempt to access each of the out-of-band management platforms using the Internet protocol addresses specified in the ordered list. As will be discussed in greater detail below, each of the out-of-band management platforms may include a copy of the configuration for the distributed system and, thereby, provide a highly available file share for the configuration of the distributed system.

In one or more embodiments of the invention, the node manager (112.2) may access the configuration for the distributed system stored in the out-of-band management platform using always-on in-band channel (115). For example, in the event of a failure of the in-band channel (118), the always-on in-band channel (115) may be utilized to access a copy of the configuration for the distributed system stored in the out-of-band management platform (116) hosted by the example node (110), in contrast to other copies of the configuration for the distributed system stored in other out-of-band management nodes. To provide this functionality, the network configuration (114) may specify that the always-on in-band channel (115) is a path to access the highly available file share but that this path may be given a priority lower than that specified for the floating Internet protocol address associated with all of the out-of-band management platforms. In this manner, embodiments of the invention may provide multiple, redundant paths for accessing the highly available file share that includes the configuration for the distributed system even in the event of a failure of the in-band channel (118). In contrast, contemporary systems may not include multiple redundant paths for accessing the highly available file share that includes the configuration for the distributed system and, consequently, may be substantial more susceptible to complete failure of the distributed system in the event of a partial failure, e.g., failure of the in-band channel (118), of the distributed system.

The out-of-band management agent (112.4) may facilitate communications between the computing resources (112) and out-of-band management platform (116). For example, the out-of-band management agent (112.4) may facilitate transfer data via an always-on in-band channel (115). The always-on in-band channel (115) may operate using a system bus that operably connects the computing resources (112) and the out-of-band manager platform (116). To provide this functionality, the out-of-band management agent (112.4) may support direct, system bus communications with the out-of-band management platform.

The persistent storage (112.6) may be a physical storage or logical storage. A physical may include any number of physical devices that provide data storage services such as, for example, hard disk drives, solid state drives, tape drives, and/or any combination and quantity of devices that provide storage services for the storage of digital data. A logical storage may be a virtualized storage that utilizes the physical storage resources of any number of physical storage devices to provide data storage services.

In one or more embodiments of the invention, the out-of-band management platform (116) provides a highly available file share to the example node (110) and/or other nodes of a distributed system. A configuration for a distributed system may be stored in the highly available file share. By doing so, embodiments of the invention may ensure that each node of the distributed system has access to the configuration for the distributed system at all points in time. In contrast, contemporary systems may not ensure that all nodes of a distributed system have access to the configuration for the distributed system when portions of the distributed system fail which can lead to a failure of the distributed system.

For example, if nodes of a distributed system are unable to access the configuration for the distributed system, the nodes may not be able to effectively coordinate their separate activities which may result in disk corruption (due to nodes writing to shared storage resources without regard to data that other nodes may be writing), communication failures (due to multiple nodes responding to client requests where only a single node is to respond to client requests), and/or failure of the distributed system.

To provide the above functionality of the out-of-band management platform (116), the out-of-band management platform (116) may perform all, or portion, of the methods illustrated in FIGS. 2.1-3.

Additionally, the out-of-band management platform (116) may support an out-of-band channel (120). For example, the out-of-band management platform (116) may include a network adapter, separate from a network adapter of the computing resources (112), which supports communications via the network (122). Further, the out-of-band management platform (116) may support an always-on in-band channel (115) between the out-of-band management platform (116) and the computing resources (112) of the example node (110). For example, the out-of-band management platform (116) may be directly connected to the computing resources (112) by a network bus or other communication channel that is not impacted by components external to the example node (110).

In some embodiments of the invention, the always-on in-band channel (115) is the same as the in-band channel (118). For example, the computing resources (112) and the out-of-band management platform (116) may each include separate network adapters operably connected via the network (122) and, thereby, provide a communication channel between the computing resources (112) and the out-of-band management platform (116).

In one more embodiments of the invention, the computing resources (112) and the out-of-band management platform (116) are identified as separate devices for networking purposes. For example, each of these components may include separate network identification information such as media access control addresses and/or Internet protocol addresses. Thus, each of these components of the example node (110) may present themselves as separate devices to other entities operably connected to the network (122).

The out-of-band management platform (116) may be a physical device. The physical device may be a computing device. The computing device may be, for example, an embedded hardware device such as, for example, an expansion card, a component integrated into a mainboard of a computing device, or another hardware entity. The computing device may include one or more processors, memory (e.g., random access memory), and persistent storage (e.g., disk drives, solid state drives, etc.). An example computing device is shown in FIG. 7. The persistent storage may store computer instructions, e.g., computer code, that when executed by the processor(s) of the computing device cause the computing device to perform the functions of the out-of-band management platform (116) described in this application and/or all, or a portion, of the methods illustrated in FIGS. 2.1-3. The out-of-band management platform (116) may be implemented using other types of computing devices without departing from the invention. For additional details regarding the out-of-band management platform (116), refer to FIG. 1.3.

FIG. 1.3 shows a diagram of the out-of-band management platform (116) in accordance with one or more embodiments of the invention. To provide the above noted functionality of the out-of-band management platform (116), the out-of-band management platform (116) may include a distributed system manager (130) and a persistent storage (132). Each component of the out-of-band management platform (116) is discussed below.

In one or more embodiments of the invention, the distributed system manager (130) (i) provides a highly available file share to nodes of a distributed system to provide ubiquitous access to a distributed system configuration (132.2) and/or (ii) enforce a node configuration (132.4) on a node hosting the out-of-band management platform (116). To provide this functionality, the distributed system manager (130) may perform all, or a portion, of the method illustrated in FIGS. 2.1-3.

In one or more embodiments of the invention, the distributed system manager (130) may include functionality to provide a highly available file share using resources of the persistent storage (132). To provide the highly available file share, the distributed system manager (130) may coordinate with any number of other out-of-band management platforms (116) to provide the highly available file share. For example, a distributed system manager (130) may include functionality to replicate changes to data stored in the highly available file share across any number of out-of-band management platforms. Thus, when data such as, for example, a distributed system configuration (132.2) (to which access is provided via the highly available file share), is modified the modification may automatically be replicated across the highly available file share. When organized to provide the highly available file share, one of the out-of-band management platforms may be designated as a primary share. The primary share may be the first location in which other entities of the system look to access data included in the highly available file share. Other out-of-band management platforms may be designated as secondary, tertiary, etc. file shares which are looked to for accessing the data included in the highly available file share when access to the primary share is unavailable due to, for example, network or device failures.

Additionally, the out-of-band management platform (116) may include functionality to directly interface with the computing resources of a node hosting the management platform. For example, the out-of-band management platform (116) may be connected to the computing resources of the node via a dedicated bus. By doing so, the out-of-band management platform (116) may support an always-on in-band channel to the computing resources of the node.

In one or more embodiments of the invention, the distributed system manager (130) is a physical device. The physical device may include circuitry. The physical device may include a field programmable gate array, application specific integrated circuit, digital signal processor, microcontroller, and/or an embedded processor. The physical device may include persistent storage that stores computing instructions which when executed by the physical device causes the physical device to perform the functions of the out-of-band management platform (116) described throughout this application.

In one or more embodiments of the invention, the distributed system manager (130) is implemented as a logical entity. For example, the distributed system manager (130) may be an application executing using computing resources of the out-of-band management platform (116).

In one or more embodiments of the invention, the persistent storage (132) is a physical device for storing digital data. The persistent storage (132) may include any number of physical devices for storing digital data. The physical devices may be, for example, hard disk drives, solid state drives, tape drives, and any other type of physical device/non-volatile memory for persistent storage of data.

In one or more embodiments of the invention, the persistent storage (132) is a virtualized resource. For example, the persistent storage (132) may be a virtual drive. The virtual drive may use computing resources of any number of physical computing devices without departing from the invention.

In one or more embodiments of the invention, the persistent storage (132) stores data structures used for configuration and/or management of nodes. For example, the persistent storage (132) may store a distributed system configuration (132.2) and/or a node configuration (132.4). Each of these data structures is discussed below.

The distributed system configuration (132.2) may be a data structure that includes information regarding the logical configuration of a distributed system. For example, the distributed system configuration (132.2) may specify which nodes of a distributed system are to be in active state while other nodes are to be in a passive state. By doing so, the distributed system configuration (132.2) may coordinate actions performed by nodes of the distributed system to ensure that the nodes cooperatively provide the functionality of the distributed system.

In addition to specifying the state of the nodes of the distributed system, the distributed system configuration (132.2) may specify additional information regarding the logical configuration of a distributed system. For example, the distributed system configuration (132.2) may specify: applications to be hosted by each of the nodes, a specification for a shared storage resource utilized by the nodes of the distributed system, and/or other information regarding redundant functionality of the nodes of the distributed system. The shared storage resource, e.g., a logical storage, may be a storage resource that utilizes physical computing resources of each of the nodes. Due to the shared nature of the shared storage resource, a failure of coordination between the nodes of the distributed system may cause data loss, in addition to other issues. For example, if the nodes fail to coordinate their writing of data to the shared storage resource data written by a node may be over written duty the writing of data to the shared storage resource of other nodes.

The node configuration (132.4) may be a data structure that includes information regarding the configuration for the node hosting the out-of-band management platform (116). For example, the node configuration (132.4) may specify hardware settings, for more settings, and/or other parameters for configuration of computing resources of a node that hosts out-of-band management platform (116). The node configuration (132.4) may be enforced on the computing resources of a node hosting the out-of-band management platform (116) by the distributed system manager (130). The node configuration (132.4) may be generated by a system administrator or other entity.

While the persistent storage (132) is illustrated as including the limited number of data structures, the persistent storage (132), may store additional, fewer, or different data structures and that illustrated in FIG. 1.3 without departing from the invention. Additionally, any of the data structures illustrated in FIG. 1.3 may be combined with other data, broken down into multiple data structures, stored in different locations, replicated, and/or spanned across any number of computing devices without departing from the invention.

Further, while for the sake of brevity the out-of-band management platform (116) has been illustrated as including a limited number of components, and out-of-band management platform (116) in accordance with embodiments of the invention include additional, fewer, and/or different components without departing from the invention.

As discussed above, the system illustrated in FIG. 1.1 may manage the configuration of nodes of the distributed system using a distributed system configuration stored in a highly available file share. FIGS. 2.1-3 show methods in accordance with one or more embodiments of the invention that may be performed by components of the system of FIG. 1.1. In the following flowcharts, the illustrated steps may be performed in different orders, any number of steps may be performed in a parallel/partially overlapping manner, steps may be omitted, and/or additional steps not shown may be performed without departing from the invention.

FIG. 2.1 shows a flowchart of a method in accordance with one or more embodiments of the invention. The method depicted in FIG. 2.1 may be used to manage a failure of a node of the distributed system in accordance with one or more embodiments of the invention. The method shown in FIG. 2.1 may be performed by, for example, a node of a distributed system (e.g., 100, FIG. 1.1). Other components of the system illustrated in FIG. 1.1 may perform the method of FIG. 2.1 without departing from the invention.

In step 200, a failure of a second node of the distributed system is identified.

In one or more embodiments of the invention, the failure of the second node is identified by receiving a message from any node of the distributed system. For example, a particular node that is operably connected to the second node may identify the failure of the second node when the second node fails to communicate with the particular node.

In one or more embodiments of the invention, the failure is a computing resource failure of the second node. For example, a processor, a memory, storage, or other physical component of the computing resources of the second node may fail causing the second node to become unreachable.

In one or more embodiments of the invention, the failure is a software failure of the second node. For example, instructions been executed by computing resources of the second node may become corrupt and thereby cause a second node to become unreachable.

In one or more embodiments of the invention, the failure is a communication channel failure. For example, and operable connection between the particular node and the second node may fail which causes the second node to become unreachable.

In one or more embodiments of the invention, the second node is a primary node. A primary node to be an active node that is providing services to clients. In contrast, a secondary node may be a passive node that is providing failover services to one or more primary nodes.

In one or more embodiments of the invention, the second node is a secondary node.

In step 202, it is determined whether second node is a primary node.

In one or more embodiments of the invention, the determination is made by accessing a distributed system configuration. As noted above, the distributed system configuration may specify the state of each node of the distributed system. To make the determination, an identity of the second node may be compared to a state for the identity of the second node specified by the distributed system configuration.

In one or more embodiments of the invention, the distributed system configuration is accessed via an in-band channel. For example, the computing resources of the node may communicate with an out-of-band management platform specified by a floating Internet protocol address. The out-of-band management platform may not be hosted by the node that includes the computing resources. Rather, the out-of-band management platform may be hosted by a different node.

In one or more embodiments of the invention, the distributed system configuration is accessed via an always-on in-band channel. For example, the computing resources of the node may communicate with an out-of-band management platform specified by network configuration. The out-of-band management platform may be specified as an alternative to a second out-of-band management platform when the second out-of-band management platform is unreachable.

For example, consider a scenario in which network information of a node specifies that a highly available file share is accessible via a floating Internet protocol address and accessible be an always-on in-band channel. The network information may specify that the always-on in-band channel is less desirable than any channel supported by the floating Internet protocol address. However, all of the network locations specified by the floating Internet protocol address may be unreachable due to a failure of an in-band channel of the node. In this scenario, the node may resort to accessing the highly available file share via the always-on in-band channel due to the inaccessibility of all locations specified by the floating Internet protocol address.

If the second node is a primary node, the method may proceed to step 204. If the second node is not a primary node, the method may end following step 202.

In step 204, it is determined whether the distributed system configuration is reachable via the in-band channel.

In one or more embodiments of the invention, the determination is made by pinging or otherwise attempting to access one or more locations specified by the floating Internet protocol address. The pinging/access may be attempted by sending one or more packets using an Internet protocol addresses specified by the floating Internet protocol address.

In one or more embodiments of the invention, the determination is made by determining a state of an in-band channel. For example, state information for the in-band channel may be maintained by the computing resources of the node.

If the distributed system configuration is reachable via the in-band channel, the method may proceed to step 206. If the distributed system configuration is not reachable via the in-band channel, the method may proceed to step 208.

In step 206, a new primary node is identified by accessing the distributed system configuration using the in-band channel.

In one or more embodiments of the invention, the distributed system configuration is accessed by sending communications to an out-of-band management platform via the in-band channel. For example, an Internet protocol address of the floating Internet protocol address may be used to send a request to access the distributed system configuration. Communication may be routed to the out-of-band management platform via the in-band channel.

In one or more embodiments of the invention, the request sent to the out-of-band management platform may request an identity of a node that is to become a primary node to replace the primary node. The out-of-band management platform may provide access to the distributed system configuration in response to this request and, thereby, coordinate the functionality of each node of the distributed system.

Returning to step 204, the method may proceed to step 208 if the distributed system configuration is not reachable via the in-band channel.

In step 208, a new primary node is identified access in the distributed system configuration using the always-on in-band channel.

In one or more embodiments of the invention, the distributed system configuration is accessed by accessing a copy of the distributed system configuration stored in an out-of-band management platform hosted by the node. In this manner, access to the distributed system configuration may be maintained even in the event of a failure of an in-band channel of the node. In contrast, contemporary distributed systems may not ensure access to the distributed system configuration when in-band channels fail.

The method may proceed to step 210 following step 206 or step 208.

In step 210, it is determined whether the node is the new primary node.

In one or more embodiments of the invention, the determination is made by comparing an identity of the node to the identity of the new primary node.

If the node is the new primary node, the method may proceed to step 212. If the node is not the new primary node, the method may end following step 210.

In step 212, a state of the node is set to active.

In one or more embodiments of the invention, setting the state of the node to active causes the node to provide services to clients of the distributed system. Prior to step 212, the node may be in a passive state to provide failover services to the second node.

In one or more embodiments of the invention, setting the state of the node to active causes the node to become a primary node.

In one or more embodiments of the invention, setting the state of the node to active may change configuration of the computing resources of the node. For example, applications executing using the computing resources may be instantiated, existing applications hosted by the computing resources they began execution, and/or settings of the computing resources may be modified. The modification of the settings of the computing resources may cause the computing resources to consume more energy while providing additional computing resources such as, for example, processor cycles, memory bandwidth, storage bandwidth, and/or network communication bandwidth. The modification of the settings of the green resources may change the availability of different types of computing resources than those discussed here without departing from the invention.

The method may end following step 212.

FIG. 2.2 shows a flowchart of a method in accordance with one or more embodiments of the invention. The method depicted in FIG. 2.2 may be used to update a distributed system configuration in accordance with one or more embodiments of the invention. The method shown in FIG. 2.2 may be performed by, for example, a node of a distributed system (e.g., 100, FIG. 1.1). Other components of the system illustrated in FIG. 1.1 may perform the method of FIG. 2.2 without departing from the invention.

In step 220, a failure of a node of the distributed system is identified. The node failure may be identified based on, for example, a failure of the node to communicate with other nodes of the distributed system. The failure of the node of the distributed system may be a total or partial failure. For example, a partial failure of the node may entail that the performance of the node may be reduced when compared to a baseline performance level. A total failure of the node of the distributed system may entail that the node is unable to perform any of its functions necessary for the operation of the distributed system.

In step 222, a distributed system configuration is updated based on the identified failure. The distributed system configuration may be updated by modifying a content attribute is system configuration. The content the distributed system configuration may be updated to reflect the total or partial failure of the node. The content of the distributed system configuration may also be updated to reflect a change in status of one or more nodes of the distributed system. For example, if the node that failed was a primary node, another node specified by the distributed system configuration may be promoted to primary node status. In this manner, the functionality performed by the field node may be taken over by another node the distributed system.

Management of the distributed system configuration may be performed via any manner without departing from the invention. For example, any entity of the system of FIG. 1.1 may analyze the failure and modify the distributed system configuration based on the analysis. The analysis may be based on any number of factors and/or criteria. The factors and/or criteria may be specified by, for example, a system administrator or other manager of the distributed system.

The method may end following step 222.

FIG. 3 shows a flowchart of a method in accordance with one or more embodiments of the invention. The method depicted in FIG. 3 may be used to update a distributed system configuration in accordance with one or more embodiments of the invention. The method shown in FIG. 3 may be performed by, for example, out-of-band management platforms hosted by nodes of a distributed system (e.g., 100, FIG. 1.1). Other components of the system illustrated in FIG. 1.1 may perform the method of FIG. 3 without departing from the invention.

In step 300, access to distributed system configuration is provided in response to a request from a node.

In one or more embodiments of the invention, access to the distributed system configuration is provided via a highly accessible file share supported by an out-of-band management platform. The request from the node may be received via an in-band channel or an always-on in-band channel. As noted above, depending on the network environment in which the nodes reside, the nodes may send such requests via either of these channels.

In step 302, an update to the distributed system configuration is obtained.

In one or more embodiments of the invention, the update is received from the node. For example, the node may identify a failure or change to a state of another node and send a notification to the out-of-band management platform.

In one or more embodiments of the invention, the update specifies a failure or state change of a node of a distributed system. For example, the update may specify that a node of the distributed system is unreachable. In another example, the update may specify that the functionality of a node of the distributed system is impaired.

In step 304, the distributed system configuration is modified using update to obtain an updated distributed system configuration.

In one or more embodiments of the invention, the distributed system configuration is modified by changing the content of the distributed system configuration based on the update obtained in step 302. For example, a state of the node specified by the distributed system configuration may be modified in accordance with update.

In one or more embodiments of the invention, the modification of the state of the node specified by the distributed system configuration changes the state of the node from a secondary to a primary node. In one or more embodiments of the invention, the modification of the state of the node specified by the distributed system configuration changes the state of the node from primary node to an inactive node. An inactive node may not be used to provide services of the distributed system to clients or provide failover services to other nodes of the distributed system. Rather, an inactive node may be reserved for maintenance by other entities.

In step 306, the updated distributed system configuration is replicated to a second out-of-band management platform.

In one or more embodiments of the invention, the updated distributed system configuration is replicated by sending data including a copy of the updated distributed system configuration or modifications to the distributed system configuration. The data may be sent to the second out-of-band management platform via an out-of-band channel.

In one or more embodiments of the invention, the data is sent as part of a data mirroring scheme that ensures that the copies of the distributed system configuration stored in each out-of-band management platform are consistent with each other. By doing so, embodiments of the invention may ensure that each node of the distributed system has access to the current copy of the distributed system configuration that all points in time. In other words, the replication to the second out-of-band management platform may be a portion of a replication of the updated distributed system configuration to any number of out-of-band management platforms, e.g., a second, three, four, or any number of out-of-band management platforms.

In one or more embodiments of the invention, the data sent via an in-band channel. For example, in some scenarios in out-of-band channel may be in an inoperable state. In this scenario, the out-of-band management platform may send the data to the computing resources of a node hosting the out-of-band management platform via an always-on in-band channel. The computing resources may then forward the data to the other out-of-band management platforms of the distributed system via the in-band channel. In this manner, multiple redundant paths for ensuring consistency of copies of the distributed system configuration across a distributed system may be provided.

The method may end following step 306.

To further clarify aspects of the invention, three non-limiting examples are shown in FIGS. 4.1-4.3, 5.1-5.4, and 6.1-6.4, respectively. Each figure grouping may provide a separate example. In each of these examples, a system similar to that shown in FIG. 1.1 is illustrated. However, for the sake of brevity, only a limited number of components of the system illustrated in FIG. 1.1 are illustrated in the following figures.

First Example

Consider a scenario has illustrated in FIG. 4.1 where a distributed system including three nodes (400, 402, 404) is providing services to clients (not shown). At the point in time illustrated in FIG. 4.1, the first node is operating as primary node (400) while the second node (402) and the third node (404) are not operating as primary nodes.

In this configuration, the first node operating as primary node (400) may be operably connected to other entities via a first in-band channel (410). Additionally, the first node (400) may include a first out-of-band management platform (400.2) operably connected to other entities via a first out-of-band channel (420). These operable connections may be supported by a network (430). The network (430) illustrated in FIG. 4.1 is shown as two components for readability but should be interpreted as general network accessibility. The general network accessibility may enable any of the components illustrated in FIG. 4.1 to communicate with other entities.

Similarly, the second node (402) may be operably connected to other entities via a second in-band channel (412). The second node (402) may also include a second out-of-band management platform (402.2) operably connected to other entities via a second out-of-band channel (422).

The third node (404) may be operably connected to other entities via a third in-band channel (414). The third node (404) may also include a third out-of-band management platform (404.2) operably connected to other entities via a third out-of-band channel (424).

While not illustrated, the out-of-band management platforms (400.2, 402.2, 404.2) may be operably connected to the computing resources of each respective node that hosts the respective out-of-band management platforms via respective always-on in-band channels.

The out-of-band management platforms collectively support a highly available file share in which a distributed system configuration is stored.

At a second point in time illustrated in FIG. 4.2, the node failure (440) occurs rendering the first node operating as primary node (400) and the first out-of-band management platform (400.2) inoperable. Due to the node failure (440), the second node (402) sends a distributed system configuration update to the remaining out-of-band management platforms (402.2, 404.2). The update specifies that a primary node failed and the third node (404) is to be promoted to primary node.

In response to receiving updates, the remaining out-of-band management platforms (402.2, 404.2) update the distributed system configuration to reflect that the third node (404) is to be a primary node and active state. Based on the updated distributed system configuration, the third node (404) modifies its state as illustrated in FIG. 4.3. Specifically, the state is modified to an active state which causes the third node to operate as a primary node (445). In this manner, the third node operating as a primary node (445) begins providing the services that were provided by the first node operating as primary node (400) prior to the node failure (440).

End of First Example

Second Example

Consider a second scenario as illustrated in FIG. 5.1. In the second scenario, components similarly numbered as those in FIG. 4.1 are identical to the components shown in FIG. 4.1. In contrast to the system illustrated in FIG. 4.1, the third out-of-band management platform is operating as a primary share (500). For example, the floating Internet protocol address associated with highly available file share supported by the out-of-band management platforms may specify an Internet protocol address specified with the third out-of-band management platform that is operating as the primary share (500) is a primary location. The floating Internet protocol address may also specify the Internet protocol addresses associated with the other out-of-band management platforms (400.2, 402.2), but as secondary and tertiary locations.

At a point in time, the third node (404) enters a partial failure state rendering the third node (404) unable to provide failover services to the first node operating as the primary node (400). To correct the partial failure state, the third node reboots (502) as illustrated in FIG. 5.2. While rebooting, the first node operating as primary node (400) fails as illustrated in FIG. 5.3.

Due to the node failure (510), the second node (402) sends a distributed system configuration update to the third out-of-band management platform operating as primary share (500). The update specifies that a primary node failed and the second node (402) is to be promoted to the primary node. Even though the third node is rebooting (502), the third out-of-band management platform operating as the primary share (500) is still able to receive the update via the third out-of-band channel (424).

In response to receiving updates, the third out-of-band management platform operating as the primary share (500) updates its copy of the distributed system configuration and replicates the updated copy of the distributed system configuration in the second out-of-band management platform (402.2).

Based on the updated distributed system configuration, the second node (402) modifies its state as illustrated in FIG. 5.4. Specifically, the state is modified to an active state which causes the second node to operate as a primary node (520). In this manner, the second node operating as a primary node (520) begins providing the services that were provided by the first node operating as primary node (400, FIG. 5.1) prior to the node failure (510).

End of Second Example

Third Example

Consider a third scenario as illustrated in FIG. 6.1. In the third scenario, the system is in an identical state as the system illustrated in FIG. 5.1. At a point in time, the third out-of-band management platform which is operating as the primary share (500) fails resulting in a management platform failure (602) as illustrated in FIG. 6.2.

Due to the management platform failure (602), the second out-of-band management platform begins operating as the primary share (604). The second out-of-band management platform automatically operates as primary share (604) because an Internet protocol address associated with it was included as a secondary Internet protocol address in a floating Internet protocol address associated with a highly available file share supported by the management platforms. Thus, after the management platform failure (602), the nodes (e.g., 400, 402, 404) automatically begin sending traffic destined for the highly available file share toward the second out-of-band management platform operating as the primary share (604).

After the second out-of-band management platform begins operating as the primary share (604), the first node operating as primary node (400) fails as illustrated in FIG. 6.3.

Due to the node failure (610), the second node (402) sends a distributed system configuration update to the second out-of-band management platform operating as primary share (604). The update specifies that a primary node failed and the third node (404) is to be promoted to the primary node. Even though the management platform failure (602) occurred, the second out-of-band management platform operating as the primary share (604) is still able to receive the update via the second in-band channel (412) and second out-of-band channel (422).

In response to receiving updates, the second out-of-band management platform operating as the primary share (604) updates its copy of the distributed system configuration.

Based on the updated distributed system configuration stored in the second out-of-band management platform operating as the primary share (604), the third node (404) modifies its state as illustrated in FIG. 6.4. Specifically, the state is modified to an active state which causes the third node to operate as a primary node (620) even though the out-of-band platform hosted by the third node has failed. In this manner, the third node operating as a primary node (620) begins providing the services that were provided by the first node operating as primary node (400, FIG. 6.1) prior to the node failure (610).

End of Third Example

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device. The communication interface (712) may include a network adapter or other hardware element that supports communications via any type of networking technology/standard.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide an improved method for managing a distributed system when compared to contemporary methods. Specifically, embodiments of the invention may provide a high-availability file share to nodes of the distributed system without requiring an independent computing device to provide the high-availability file share.

Additionally, embodiments of the invention may address the problem of device failure in a distributed system. In contrast to contemporary systems that rely on single device to provide file sharing services for distributed system configuration management control, embodiments of the invention may provide a distributed architecture for managing such configuration files. By doing so, embodiments of the invention may provide a highly fault-tolerant system for managing the operation of the distributed system. In contrast to contemporary systems, a distributed system in accordance with embodiments of the invention may automatically address numerous types of failure modes such as, for example, communication channel failures and file storage failures that would each render contemporary distributed systems unable to properly manage the functionality of the distributed system.

Further, embodiments of the invention may provide a decentralized architecture for the management of distributed systems. In contrast, contemporary systems that rely on a single point or management entity for managing nodes of the distributed system. The decentralized architecture in accordance with embodiments of the invention may provide redundancy via the duplication of configuration files and redundant communication channels. This redundancy may improve fault tolerance of distributed systems with respect to continued continuing to provide services of the distributed system even when components of the distributed system fail compared to contemporary distributed systems.

Thus, embodiments of the invention may address the problem of device failure in a distributed system. This problem arises due to the nature of distributed systems that rely on numerous components to provide the functionality of distributed systems. Accordingly, embodiments of the invention may address practical problems that arise in the field of distributed system technology.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

In some cases, elements within figures may be labeled as 1-N. For such listings, the elements should be understood as being any number of such elements. Further, similarly labeled elements may have different numbers of such elements. For example, if the number of processors is labeled as 1-N and the number of memory modules is labeled as 1-N, the number of processors may be the same number or a different number from that of the number of memory modules. Additionally, elements described throughout this application using a plural form should be understood as including from 1-N of such elements. For example, the recitation "processors" should be understood as including any number of processors from 1-N.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A node for a distributed system comprising a plurality of nodes, wherein each node of the distributed system hosts a corresponding out-of-band management entity comprising separate computing resources from computing resources of the plurality of nodes of the distributed system, the computing resources of each of the out-of-band management entities store a copy of a distributed system configuration for the distributed system, comprising:
    computing resources of the node used to provide the functionality of the node; and
    a node manager programmed to:
        identify a failure of a second node of the plurality of nodes of the distributed system;
        in response to identifying the failure:
            make a first determination that the second node is a primary node of the distributed system;
            after making the first determination:
                identify a new primary node of the plurality of nodes by accessing a copy of the distributed system configuration stored in a one of the plurality of out-of-band management entities; and
                provide services of the distributed system to a client using the computing resources of the node after identifying the new primary node.

2. The node of claim 1, wherein the node manager is further programmed to:
    before identifying the new primary node:
        make a second determination that the one of the plurality of the out-of-band management entities is reachable via an in-band channel routed through a network and an out out-of-band channel; and
        in response to the second determination:
            access the distributed system configuration via the in-band channel.

3. The node of claim 2, wherein the one of the plurality of out-of-band management entities is not hosted by the node.

4. The node of claim 2, wherein the one of the plurality of out-of-band management entities is hosted by the node.

5. The node of claim 1, wherein the node manager is further programmed to:
    before identifying the new primary node:
        make a second determination that the one of the plurality of out-of-band management entities is unreachable via any in-band channels that is routed through a network and an out out-of-band channel; and
        in response to the second determination:
            access the distributed system configuration via an always-on in-band channel that directly connects the computing resources of the one of the plurality of the out-of-band management entities and the computing resources of the node.

6. The node of claim 5, wherein the copy of the distributed system configuration is stored in a second out-of-band management entity.

7. The node of claim 6, wherein the second out-of-band management entity is hosted by the node.

8. The node of claim 7, wherein the always-on in-band channel is supported by an out-of-band management agent executing on the computing resources.

9. The node of claim 8, wherein the always-on in-band channel utilizes a system bus that operably connects the computing resources and the second out-of-band management entity.

10. The node of claim 1, wherein the one of the plurality of out-of-band management entities is programmed to:
identify changes to a configuration of the distributed system;
modify the distributed system configuration based on the identified changes to obtain an updated distributed system configuration; and
replicate the updated distributed system configuration in a second out-of-band management entity of the plurality of out of band management entities.

11. The node of claim 10, wherein both of the one of the plurality out-of-band management entities and the second out-of-band management entity are associated with a floating internet protocol address.

12. The node of claim 10, wherein the updated distributed system configuration is replicated to the second out-of-band management entity via an out-of-band channel that is routed through a network.

13. The node of claim 12, wherein the one of the plurality of out-of-band management entities is programmed to:
provide the updated distributed system configuration to all nodes of the plurality of nodes of the distributed system via an in-band channel associated with the computing resources through a network; and
provide the updated distributed system configuration to only the node of the plurality of nodes via an always-on in-band channel associated with the one of the plurality of out-of-band management entities.

14. The node of claim 1, wherein the node manager is further programmed to:
before providing the services of the distributed system:
make a second determination that the node is the new primary node; and
in response to the second determination:
modify a state of the node to active.

15. The node of claim 14, wherein the services provided to the distributed system are based on the state of the node.

16. A method for managing a node of a distributed system comprising a plurality of nodes, wherein each node of the distributed system hosts a corresponding out-of-band management entity comprising separate computing resources from computing resources of the distributed system, wherein the computing resources of each of the out-of-band management entities store a copy of a distributed system configuration for the distributed system, comprising:
identifying a failure of a second node of the plurality of nodes of the distributed system;
in response to identifying the failure:
making a first determination that the second node is a primary node of the distributed system;
after making the first determination:
identifying a new primary node of the plurality of nodes by accessing a copy of the distributed system configuration stored in one of the plurality of out-of-band management entities; and
providing services of the distributed system to a client using computing resources of the node after identifying the new primary node.

17. The method of claim 16, wherein the method further comprises:
before identifying the new primary node:
making a second determination that the one of the plurality of the out-of-band management entities is reachable via an in-band channel routed through a network and an out-of-band channel of the one of the plurality of the out-of-band management entities; and
in response to the second determination:
accessing the distributed system configuration via the in-band channel.

18. A non-transitory computer readable medium comprising computer readable program code, which when executed by a computer processor enables the computer processor to perform a method for managing a node of a distributed system comprising a plurality of nodes, wherein each node of the distributed system hosts a corresponding out-of-band management entity comprising separate computing resources from computing resources of the distributed system, wherein the computing resources of each of the out-of-band management entities store a copy of a distributed system configuration for the distributed system, the method comprising:
identifying a failure of a second node of the plurality of nodes of the distributed system;
in response to identifying the failure:
making a first determination that the second node is a primary node of the distributed system;
after making the first determination:
identifying a new primary node of the plurality of nodes by accessing a copy of the distributed system configuration stored in one of the plurality of out-of-band management entities; and
providing services of the distributed system to a client using computing resources of the node after identifying the new primary node.

19. The non-transitory computer readable medium of claim 18, wherein the method further comprises:
before identifying the new primary node:
making a second determination that the one of the plurality of the out-of-band management entities is reachable via an in-band channel routed through a network and an out-of-band channel of the one of the plurality of the out-of-band management entities; and
in response to the second determination:
accessing the distributed system configuration via the in-band channel.

* * * * *